US012469227B2

United States Patent
Du et al.

(10) Patent No.: US 12,469,227 B2
(45) Date of Patent: Nov. 11, 2025

(54) DEPTH-BASED RELIGHTING IN AUGMENTED REALITY

(71) Applicant: GOOGLE LLC, Mountain View, CA (US)

(72) Inventors: Ruofei Du, San Francisco, CA (US); David Kim, Zug (CH)

(73) Assignee: GOOGLE LLC, Mountain View, CA (US)

( * ) Notice: Subject to any disclaimer, the term of this patent is extended or adjusted under 35 U.S.C. 154(b) by 43 days.

(21) Appl. No.: 18/000,237

(22) PCT Filed: Jun. 22, 2020

(86) PCT No.: PCT/US2020/070163
§ 371 (c)(1),
(2) Date: Nov. 29, 2022

(87) PCT Pub. No.: WO2021/262243
PCT Pub. Date: Dec. 30, 2021

(65) Prior Publication Data
US 2023/0206568 A1    Jun. 29, 2023

(51) Int. Cl.
*G06T 15/50*    (2011.01)
*G06T 7/50*    (2017.01)
(Continued)

(52) U.S. Cl.
CPC .............. *G06T 19/006* (2013.01); *G06T 7/50* (2017.01); *G06T 7/70* (2017.01); *G06T 7/90* (2017.01);
(Continued)

(58) Field of Classification Search
CPC ....... G06T 15/506; G06T 15/50; G06T 15/80; G06T 15/60; G06T 15/06; G06T 17/05;
(Continued)

(56) References Cited

U.S. PATENT DOCUMENTS 9,001,226 B1    4/2015    Ng et al.
9,609,206 B2    3/2017    Nakada
(Continued)

FOREIGN PATENT DOCUMENTS

CN    110533707 A    12/2019
EP    1720131 A1    11/2006
(Continued)

OTHER PUBLICATIONS

International Search Report and Written Opinion for PCT Application No. PCT/US2020/070163, mailed on Nov. 6, 2020, 10 pages.
(Continued)

*Primary Examiner* — Gordon G Liu
(74) *Attorney, Agent, or Firm* — Brake Hughes Bellermann LLP

(57) ABSTRACT

A system and method for relighting of an augmented reality scene are provided. Image data and depth data corresponding to a physical environment may be captured by an image sensor of a computing device, for display in an AR scene generated by the computing device. The system may use the image data and depth data to generate a live depth map of the physical environment. A virtual light source may be placed in the AR scene of the physical environment in response to a user input. The system may relight the AR scene in response to the placement of the virtual light source based on the image data and the depth map.

21 Claims, 19 Drawing Sheets

(51) Int. Cl.
- *G06T 7/70* (2017.01)
- *G06T 7/90* (2017.01)
- *G06T 19/00* (2011.01)
- *G06T 19/20* (2011.01)

(52) U.S. Cl.
CPC ............ *G06T 15/506* (2013.01); *G06T 19/20* (2013.01); *G06T 2207/10028* (2013.01); *G06T 2219/2012* (2013.01)

(58) Field of Classification Search
CPC .......... G06T 19/006; G06T 7/50; G06T 7/70; G06T 7/90; G06T 19/20; G06T 2219/2012; G01S 17/89; G01S 17/931; G05D 1/0231; G06N 20/00; G07C 5/02
USPC ........................................................ 345/426
See application file for complete search history.

(56) References Cited

U.S. PATENT DOCUMENTS

| | | |
|---|---|---|
| 2013/0271625 A1 | 10/2013 | Schmalstieg et al. |
| 2015/0262412 A1 | 9/2015 | Gruber et al. |
| 2015/0281565 A1* | 10/2015 | Nakada ................. G06F 3/0481 348/234 |
| 2016/0364914 A1* | 12/2016 | Todeschini ......... G02B 27/0172 |
| 2018/0097867 A1* | 4/2018 | Pang .................... H04N 5/2226 |
| 2020/0051212 A1* | 2/2020 | Kitajima ................ H04N 23/76 |
| 2020/0104541 A1* | 4/2020 | Harrison ................. G06T 15/50 |
| 2020/0143588 A1* | 5/2020 | Kaneko ..................... G06T 7/73 |

FOREIGN PATENT DOCUMENTS

| | | |
|---|---|---|
| JP | 2013125292 A | 6/2013 |
| JP | 2015201839 A | 11/2015 |
| WO | 2019226366 A1 | 11/2019 |

OTHER PUBLICATIONS

Written Opinion of the International Preliminary Examining Authority for PCT Application No. PCT/SU2020/070163, mailed on May 20, 2021, 6 pages.

First Office Action (with English translation) for Chinese Application No. 202080102247.8, mailed Aug. 20, 2024, 22 pages.

* cited by examiner

Example Algorithm

Input : A screen point $\mathbf{p} \leftarrow (x, y)$ and focal length $f$.
Output: The estimated normal vector $\mathbf{n}$.

1. Set the sample radius: $r \leftarrow 2$ pixels.
2. Initialize the counts along two axes: $c_X \leftarrow 0, c_Y \leftarrow 0$.
3. Initialize the correlation along two axes: $\rho_X \leftarrow 0, \rho_Y \leftarrow 0$.
4. for $\Delta x \in [-r, r]$ do
5.     for $\Delta y \in [-r, r]$ do
6.         Continue if $\Delta x = 0$ and $\Delta y = 0$.
7.         Set neighbor's coordinates: $\mathbf{q} \leftarrow [x + \Delta x, y + \Delta y]$.
8.         Set $\mathbf{q}$'s distance in depth: $d_{\mathbf{pq}} \leftarrow \|D(\mathbf{p}), D(\mathbf{q})\|$.
9.         Continue if $d_{\mathbf{pq}} = 0$.
10.        if $\Delta x \neq 0$ then
11.             $c_X \leftarrow c_X + 1$.
12.             $\rho_X \leftarrow \rho_X + d_{\mathbf{pq}}/\Delta x$.
13.         end
14.         if $\Delta y \neq 0$ then
15.             $c_Y \leftarrow c_Y + 1$.
16.             $\rho_Y \leftarrow \rho_Y + d_{\mathbf{pq}}/\Delta y$.
17.         end
18.     end
19. end
20. Set pixel size: $\lambda \leftarrow \frac{D(\mathbf{p})}{f}$.
21. return the normal vector $\mathbf{n}$: $\left(-\frac{\rho_Y}{\lambda c_Y}, -\frac{\rho_X}{\lambda c_X}, -1\right)$.

FIG. 6

DEPTH-BASED RELIGHTING IN AUGMENTED REALITY

CROSS REFERENCE TO RELATED APPLICATION

This application is a 35 U.S.C. § 371 National Phase Entry Application from PCT/US2020/070163, filed Jun. 22, 2020, designating the U.S., the disclosure of which is incorporated herein by reference in its entirety.

TECHNICAL FIELD

This description relates to augmented reality (AR), and in particular, to lighting for AR.

BACKGROUND

An Augmented Reality (AR) environment may fuse virtual elements with physical elements to produce an AR scene. In some situations, the AR scene may be enhanced by the addition of various visual effects. For example, in some situations, the AR scene may be enhanced by animations, lighting and the like. Lighting in AR may pose challenges when fusing the virtual elements with the physical elements in the AR scene, particularly as elements within the AR scene shift or change. Relighting in an AR scene, substantially in real time, may provide a more engaging, and/or a more realistic user experience. However, substantially real time relighting of the AR scene is challenging due to the dynamic nature of the AR scene, and other such factors.

SUMMARY

In one general aspect, a computer-implemented method may include capturing, by an image sensor of a computing device, image data corresponding to an image of a physical environment, detecting, by a depth sensor of the computing device, depth data corresponding to the physical environment, generating, by a processor of the computing device, an augmented reality (AR) scene from the image data corresponding to the image of the physical environment, receiving, at an input device of the computing device, an input placing a virtual light source in the AR scene, and relighting the AR scene based on a placement position of the virtual light source in the AR scene and the depth data corresponding to the physical environment.

In some implementations, the detecting the depth data may include generating a depth map corresponding to the physical environment. In some implementations, the method may also include detecting, by the image sensor, color data corresponding to the image of the physical environment, and generating a color map corresponding to the image of the physical environment, the color map providing at least one of color characteristics or reflectivity characteristics of each pixel of a plurality of pixels of the AR scene of the physical environment.

In some implementations, relighting the AR scene may include detecting a three-dimensional coordinate position of the virtual light source in the physical environment corresponding to the placement position of the virtual light source in the AR scene. In some implementations, for each pixel, of a plurality of pixels of the AR scene, the method may include setting an intensity level of the pixel based on an intensity of the virtual light source and a distance of the pixel from the virtual light source in the AR scene, setting a color of the pixel based on a color of the virtual light source, the distance of the pixel from the virtual light source, and a color of the pixel in the AR scene, and setting a reflectivity of the pixel based on the color of the virtual light source and the color of the pixel in the AR scene.

In some implementations, relighting the AR scene may include, for each pixel of the plurality of pixels of the AR scene, detecting obstacles between the placement position of the virtual light source and the pixel based on the depth map, and adjusting the set intensity level, the set color, and the set reflectivity of the pixel based on the detected obstacles. In some implementations, generating the AR scene may include darkening the image of the physical environment to simulate a darkened physical environment. In some implementations, relighting the AR scene may include relighting the darkened AR scene to include, for each pixel of the plurality of pixels, relighting the pixel to the adjusted intensity level, the adjusted color, and the adjusted reflectivity.

In some implementations, relighting the AR scene may include applying the adjusted intensity level, the adjusted color, and the adjusted reflectivity, to the AR scene, generating a composite rendering of the physical environment in the AR scene including the adjusted intensity level, the adjusted color, and the adjusted reflectivity, and displaying the composite rendering of the AR scene on a display device of the computing device. In some implementations, relighting the AR scene may include, for each pixel of the plurality of pixels, detecting a distance of the pixel from the placement position of the virtual light source in the AR scene, and in response to detection of the pixel at a position corresponding to the placement position of the virtual light source in the AR scene, setting the intensity, the color and the reflectivity of the pixel to the intensity, the color and the reflectivity of the virtual light source. In some implementations, the intensity of the pixel may be inversely proportional to a square of the distance between the virtual light source and the pixel.

In another general aspect, a system may include a camera assembly, a display device, at least one processor, and a memory storing instructions that, when executed by the at least one processor, cause the system to capture image data corresponding to an image of a physical environment, detecting depth data corresponding to the physical environment, generate an augmented reality (AR) scene from the image data corresponding to the image of the physical environment, receive an input corresponding to placement of a virtual light source in the AR scene, and relight the AR scene based on a placement position of the virtual light source in the AR scene and the depth data corresponding to the physical environment In some implementations, in which the camera assembly includes a depth sensor and an image sensor, the instructions may cause the system to generate a depth map of the physical environment based on the depth data collected by the depth sensor, and generate a color map of the physical environment based on the image data collected by the image sensor, the color map providing at least one of color characteristics or reflectivity characteristics of each pixel of a plurality of pixels of the AR scene of the physical environment.

In some implementations, the instructions may cause the system to detect a three-dimensional coordinate position of the virtual light source in the physical environment corresponding to the placement position of the virtual light source in the AR scene, and, for each pixel, of a plurality of pixels of the AR scene, to set an intensity level of the pixel based on an intensity of the virtual light source and a distance of the pixel from the virtual light source in the AR scene, set a color of the pixel based on a color of the virtual light source, the distance of the pixel from the virtual light source, and a color of the pixel in the AR scene, and set a reflectivity of the pixel based on the color of the virtual light source and the color of the pixel in the AR scene.

In some implementations, the instructions may cause the system to detect obstacles between the placement position of the virtual light source in the AR scene and the pixel based on the depth map, and adjust the set intensity level, the set color, and the set reflectivity of the pixel based on the detected obstacles. In some implementations, the instructions may cause the system to darken the image of the physical environment in the AR scene to simulate a darkened physical environment; and relight the darkened AR scene, including, for each pixel of the plurality of pixels, and relight the pixel to the adjusted intensity level, the adjusted color, and the adjusted reflectivity. In some implementations, the instructions may cause the system to apply the adjusted intensity level, the adjusted color, and the adjusted reflectivity, to the AR scene, generate a composite rendering of the physical environment in the AR scene including the adjusted intensity level, the adjusted color, and the adjusted reflectivity, and display the composite rendering of the AR scene on the display device.

In some implementations, the instructions may cause the system to, for each pixel of the plurality of pixels, detect a distance of the pixel from the placement position of the virtual light source in the AR scene, and in response to detection of the pixel at a position corresponding to the placement position of the virtual light source in the AR scene, set the intensity, the color and the reflectivity of the pixel to the intensity, the color and the reflectivity of the virtual light source. In some implementations, the intensity of the pixel may be inversely proportional to a square of the distance between the virtual light source and the pixel.

BRIEF DESCRIPTION OF THE DRAWINGS

FIG. 6 is an example algorithm for ray marching in an AR scene, according to an example implementation.

It should be noted that these Figures are intended to illustrate the general characteristics of methods, structure, or materials utilized in certain example implementations and to supplement the written description provided below. These drawings are not, however, to scale and may not precisely reflect the precise structural or performance characteristics of any given implementation, and should not be interpreted as defining or limiting the range of values or properties encompassed by example implementation. The use of similar or identical reference numbers in the various drawings is intended to indicate the presence of a similar or identical element or feature.

DETAILED DESCRIPTION

This disclosure relates to Virtual Reality (VR) and/or Augmented Reality (AR) experiences and techniques to enable users to view and experience virtual content in, for example, an AR scene. Systems and methods, in accordance with implementations described herein, may provide for the relighting of an AR scene generated by a computing device and displayed in a camera view of the computing device, substantially in or near real time, to provide for more realistic effects, and to enhance the user experience with the AR scene. For example, in some implementations, such real time scene relighting may allow virtual light sources to illuminate the physical world in an AR scene in the camera view of the computing device. In some implementations, such real time scene relighting may provide for dynamic relighting of the AR scene as the virtual light source(s) shift and/or the viewing perspective of the physical world in the AR scene shifts. In some implementations, the virtual lighting source(s) may illuminate the physical world in the AR experience based on depth data such as, for example, depth data collected by a depth sensor of the computing device.

Figure 1:
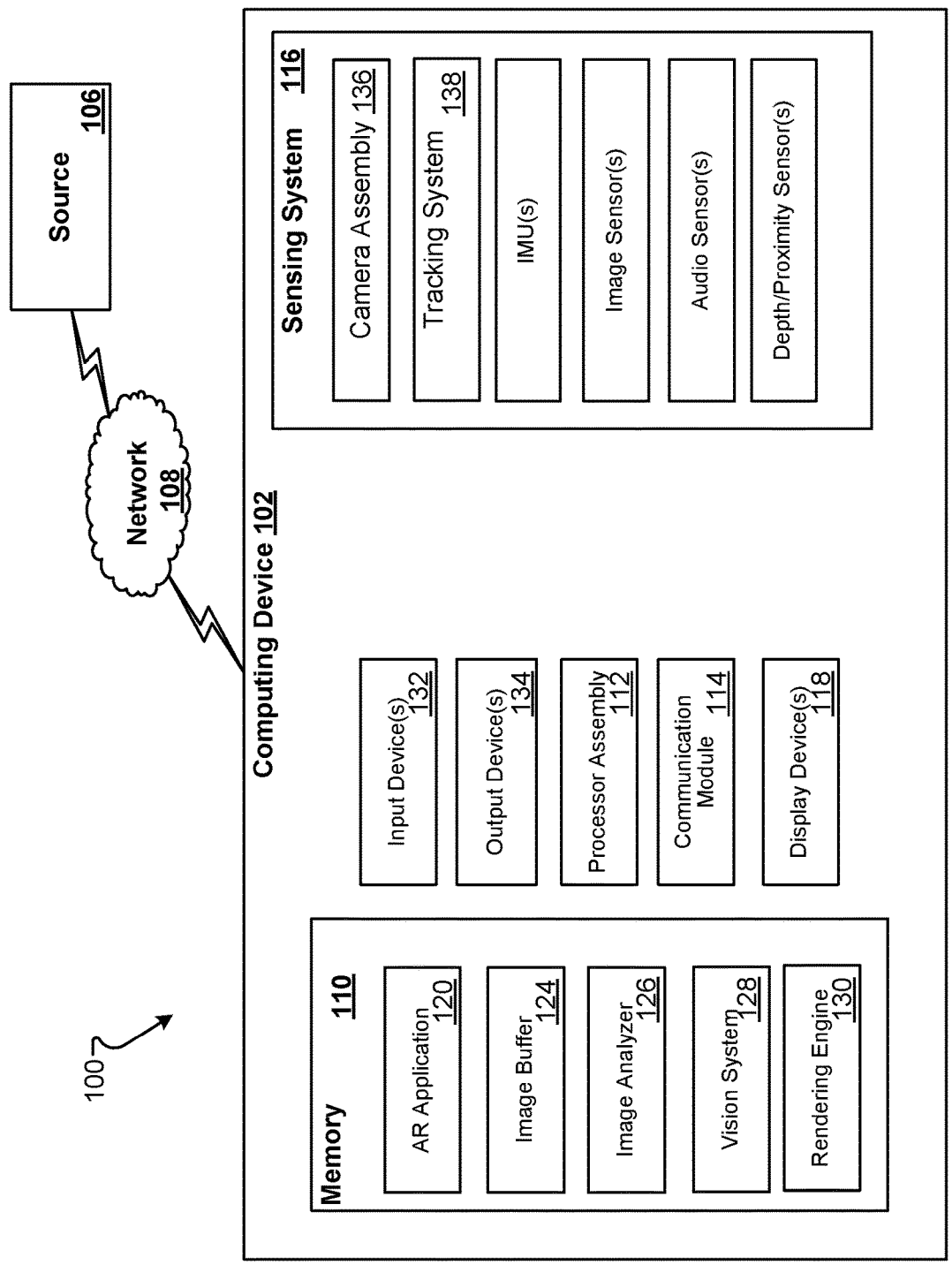
FIG. 1 illustrates a block diagram of data system for depth-based relighting of an AR scene, according to an example implementation.

FIG. 1 is a block diagram of an example system 100 for providing depth-based, substantially real-time AR scene relighting, in accordance with an example implementation. As shown in FIG. 1, the example system 100 may include an example computing device 102 that can receive content from an external source 106 via a network 108. The example computing device 102 may include a memory 110, a processor assembly 112, a communication module 114, a sensing system 116, and a display device 118. In some implementations, the computing device 102 may include various user input devices 132 such as, for example, a touch input device that can receive tactile user inputs, a microphone that can receive audible user inputs, and the like. In some implementations, other, external/peripheral devices may communicate with and function as input devices. In some implementations, the computing device 102 may include one or more output devices 134, such as, for example, a display for visual output, a speaker for audio output, and the like. In some implementations, the memory 110 may include an AR application 120, an image buffer 124, an image analyzer 126, a computer vision system 128, and a rendering engine 130, and the like. In some implementations, the computer vision system 128 may include a lighting estimator that estimates proper lighting for AR content displayed by the computing device 102, that extracts lighting information from an AR scene, and the like. In some implementations, the sensing system 116 may include, for example, a camera system 136, a position tracking system 138 including, for example, inertial measurement unit sensors (i.e., accelerometers, gyroscopes, magnetometers, and the like), image sensors, distance/proximity sensors, audio sensors, and other types of sensors.

In some implementations, the computing device 102 can be a mobile computing device such as, for example, a smartphone, smart glasses or other type of head-mounted display device, a smart watch, a tablet computing device, a laptop computing device, and the like, which may be configured to provide or output AR content to a user.

The memory 110 can include one or more non-transitory computer-readable storage media. The memory 110 may store instructions and data that are usable to generate an AR environment for a user.

The processor assembly 112 can include one or more devices that are capable of executing instructions, such as instructions stored by the memory 110, to perform various tasks associated with the systems and methods described herein. For example, the processor assembly 112 may include a central processing unit (CPU) and/or a graphics processor unit (GPU). For example, if a GPU is present, some image/video rendering tasks may be offloaded from the CPU to the GPU.

The communication module 114 can include one or more devices for communicating with other computing devices, such as, for example, external computing devices, the external source 106, and the like. The communication module 114 may communicate via wireless or wired networks, such as the network 108.

The camera assembly 136 can capture images, for example, still and/or moving images, or videos, of the physical environment, or space, around the computing device 102. In some implementations, the camera assembly 136 may include one or more cameras. In some implementations, the camera assembly 136 may include one or more depth sensors, an infrared camera, and the like.

Figure 2:
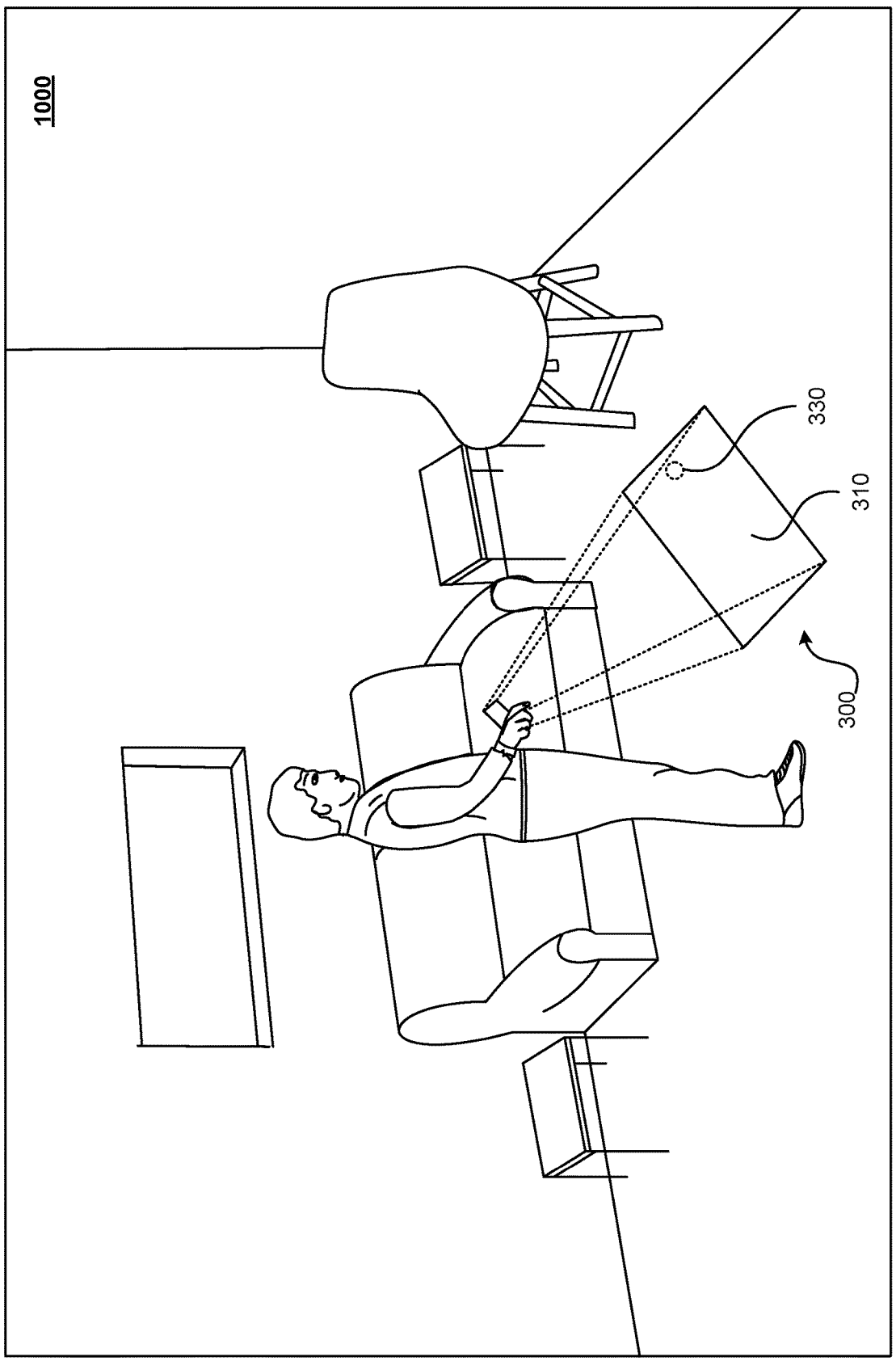
FIG. 2 is a third person view of user operation of an example computing device in a physical environment, according to an example implementation.

FIG. 2 illustrates a user within an example physical environment 1000, or room 1000, using a computing device 300. In the example shown in FIG. 2, the example computing device 300 is in the form of a handheld mobile computing device, such as a smart phone, held by the user, simply for purposes of discussion and illustration. As noted above, principles to be described herein may be applied to different types of computing devices, so that a system, in accordance with implementations described herein, may provide for virtual lighting sources to illuminate real world, physical entities in a mobile AR experience. The example computing device 300 shown in FIG. 2 includes a camera assembly 330. In some implementations, objects within the field of view, or live viewfinder, of the camera assembly 330, may be visible to the user on a display device 310 of the computing device 300. In some implementations, the camera assembly 330 may include, for example, one or more cameras such as, for example, a front facing camera and/or a rear facing camera capturing still and/or moving images, other types of image sensor(s), one or more depth sensor(s), one or more light sensor(s), and other such components.

Fusing virtual elements (for example, virtual objects, or AR objects) with the physical world to develop (e.g., generate, define) an AR scene may rely not just on a semantic, instance-level understanding of the elements of the AR scene (i.e., both the virtual/AR elements and the physical elements) but also of the lighting, and the relighting of the AR scene as the elements move, a camera view of the AR scene changes perspective (for example, due to movement of the computing device) and the like. In a system and method, in accordance with implementations described herein, virtual light, generated by a virtual light source placed in an AR scene, using mathematical approximation and propagation of the light, in real time, or substantially real time. A system and method, in accordance with implementations described herein, may account for occlusions, changes in position of the virtual light source, changes perspective of the (virtual and physical) elements in the AR scene, and other such factors, in the lighting and the relighting of the AR scene.

FIGS. 3A-3F illustrate the development of an AR scene, including one or more AR elements, including an example virtual light source, placed in a camera view of a corresponding portion of the physical environment 1000. The camera view may be captured within the viewfinder, or within the field of view, of the camera assembly 330 of the computing device 300, and may be visible on the display device 310 of the computing device 300.

Figure 3A:
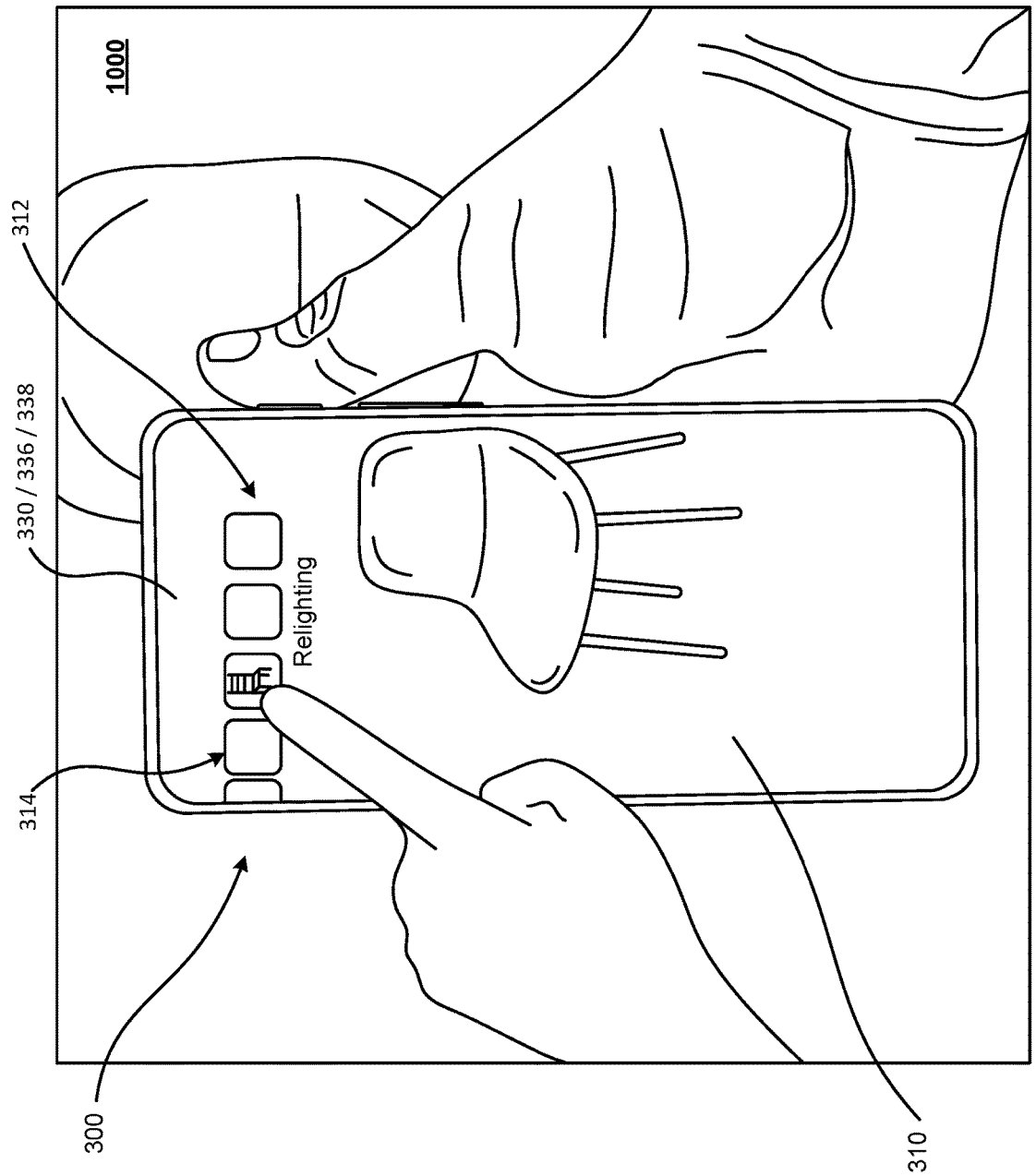
FIGS. 3A-3F illustrate lighting and relighting of an example AR scene in response to user input, according to an example implementation.
Figure 3B:
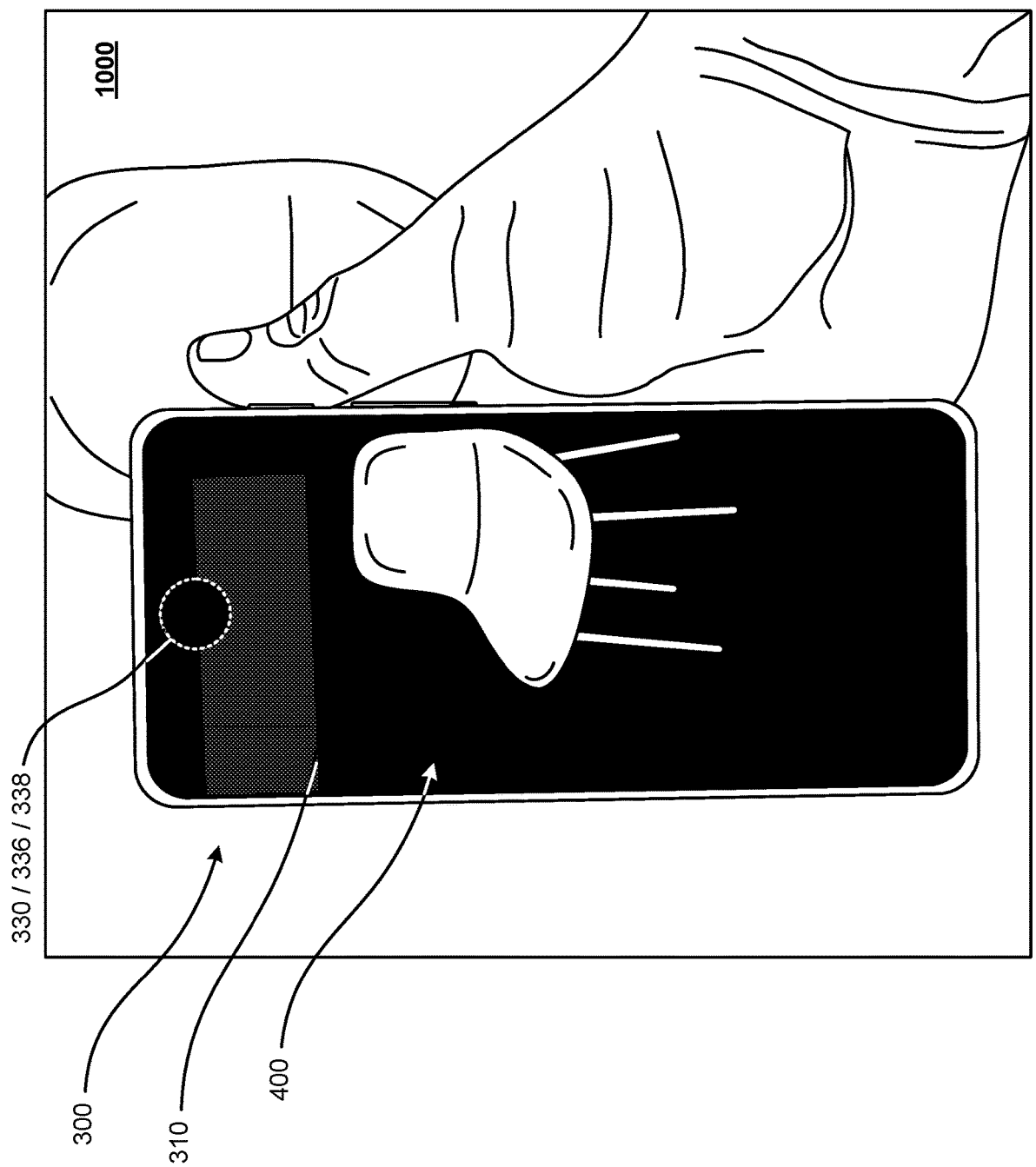
Figure 3C:
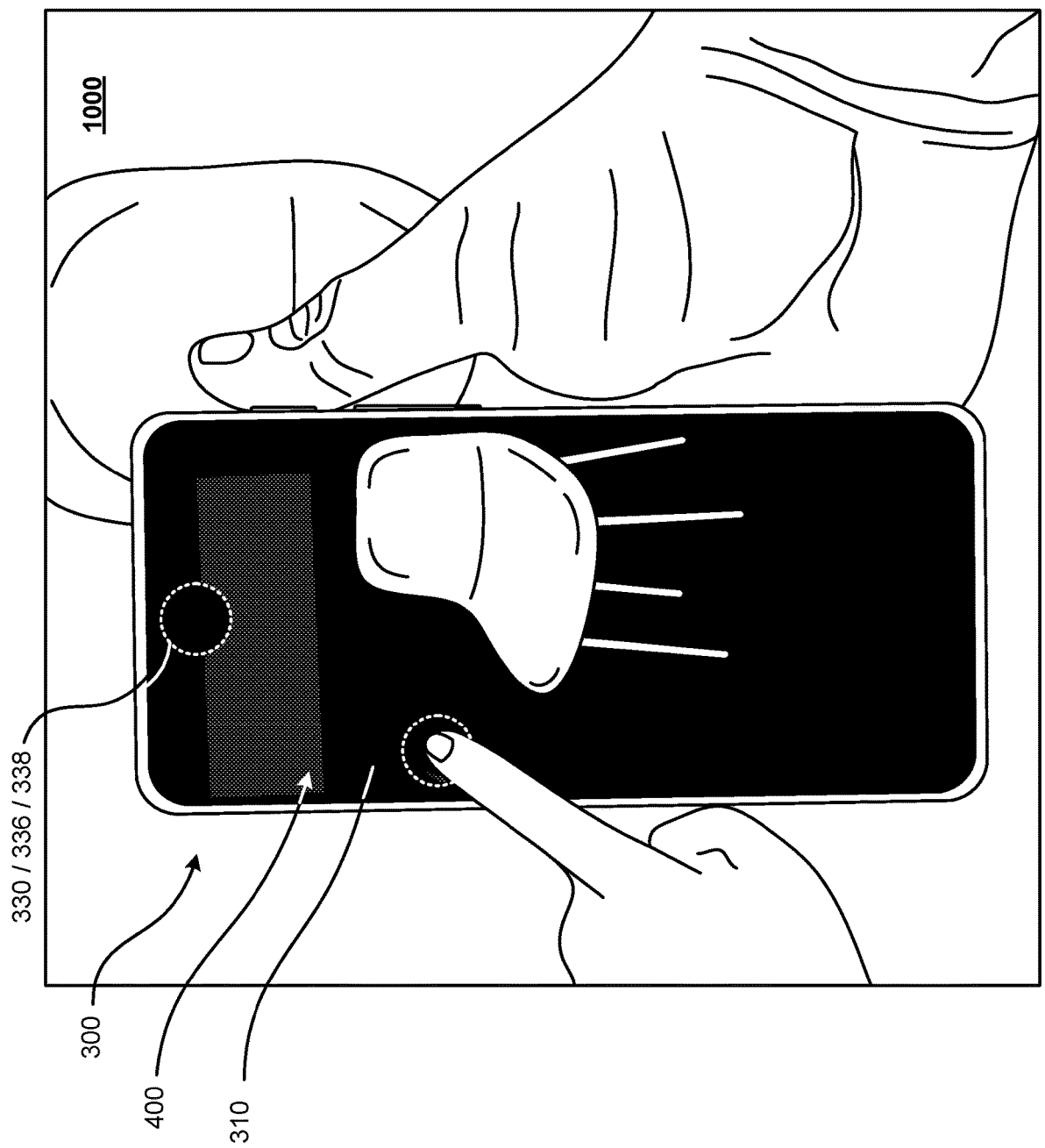

As shown in FIG. 3A, a portion of the physical environment 1000, or room 1000, captured within the field of view of a forward facing camera 336 of the camera assembly 330 may be displayed on the display device 310 of the computing device 300 to develop an AR scene 400 that is viewable by the user on the display device 310. In generating the AR scene 400, the user may wish to place a virtual light source 410 within AR scene 400 including the physical environment 1000, or to relight the AR scene 400. The user may select a lighting mode, or a relighting mode, from a menu bar 312 displayed on the display device 310. In response to the user selection of the lighting mode, or the relighting mode, in FIG. 3A, a basis for the AR scene 400 is visible on the display device 310, as shown in FIG. 3B. In this particular example, the portion of the physical environment 1000 within the viewfinder, or field of view, of the camera assembly 330 is displayed in a darkened state, i.e., without ambient lighting, in response to the selection of the lighting mode, or the relighting mode. In an arrangement in which the display device 310 is a touch input display device 310 that can receive touch inputs, a user may apply a touch input to the display device 310, at a position in the AR scene 400 corresponding to a position at which the user wishes to place a light source, as shown in FIG. 3C. This may allow for the placement of the virtual light source 410, as shown in FIG. 3D, within the AR scene 400, at a position within the AR scene 400 selected by the user, and, in this example, corresponding to a position in the physical environment 1000.

Figure 3D:
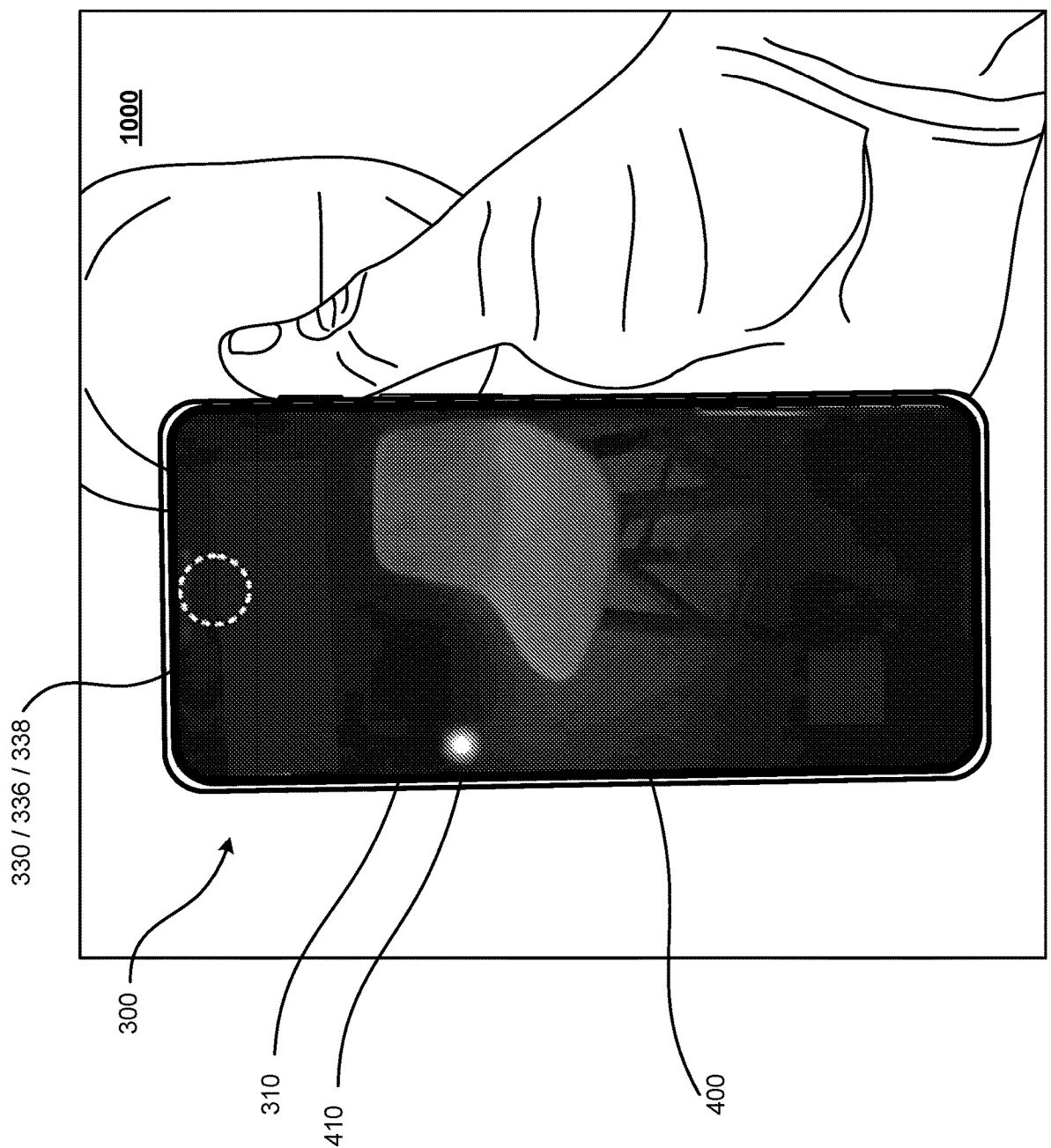

Placement of the virtual light source 410 as described above may cause illumination of the AR scene 400, from the relatively darkened state shown in FIG. 3B, to the relatively illuminated state shown in FIG. 3D. In some implementations, the user may select and/or adjust properties or characteristics of the virtual light source 410. For example, in some implementations, the user may adjust or move a positioning of the virtual light source 410. In some implementations, the user may select and/or change a color of light to be emitted by the virtual light source 410. In some implementations, the user may select and/or change an intensity of light to be emitted by the virtual light source 410.

Figure 3E:
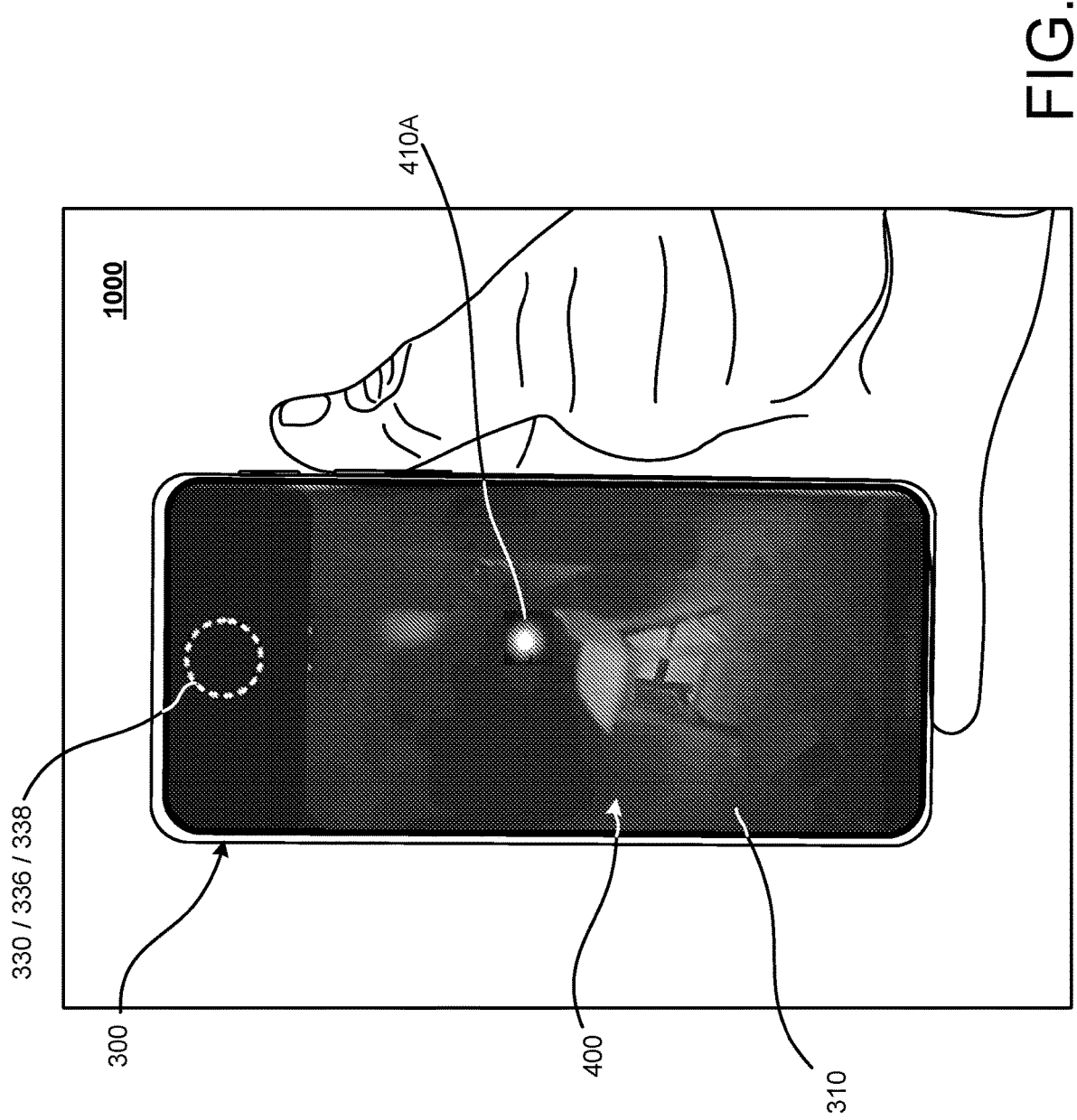

FIG. 3E illustrates an example arrangement, in which a position of the computing device 300 relative to the physical elements in the physical environment 1000, or a perspective, has shifted compared to the arrangement shown in FIG. 3D.

Figure 3F:
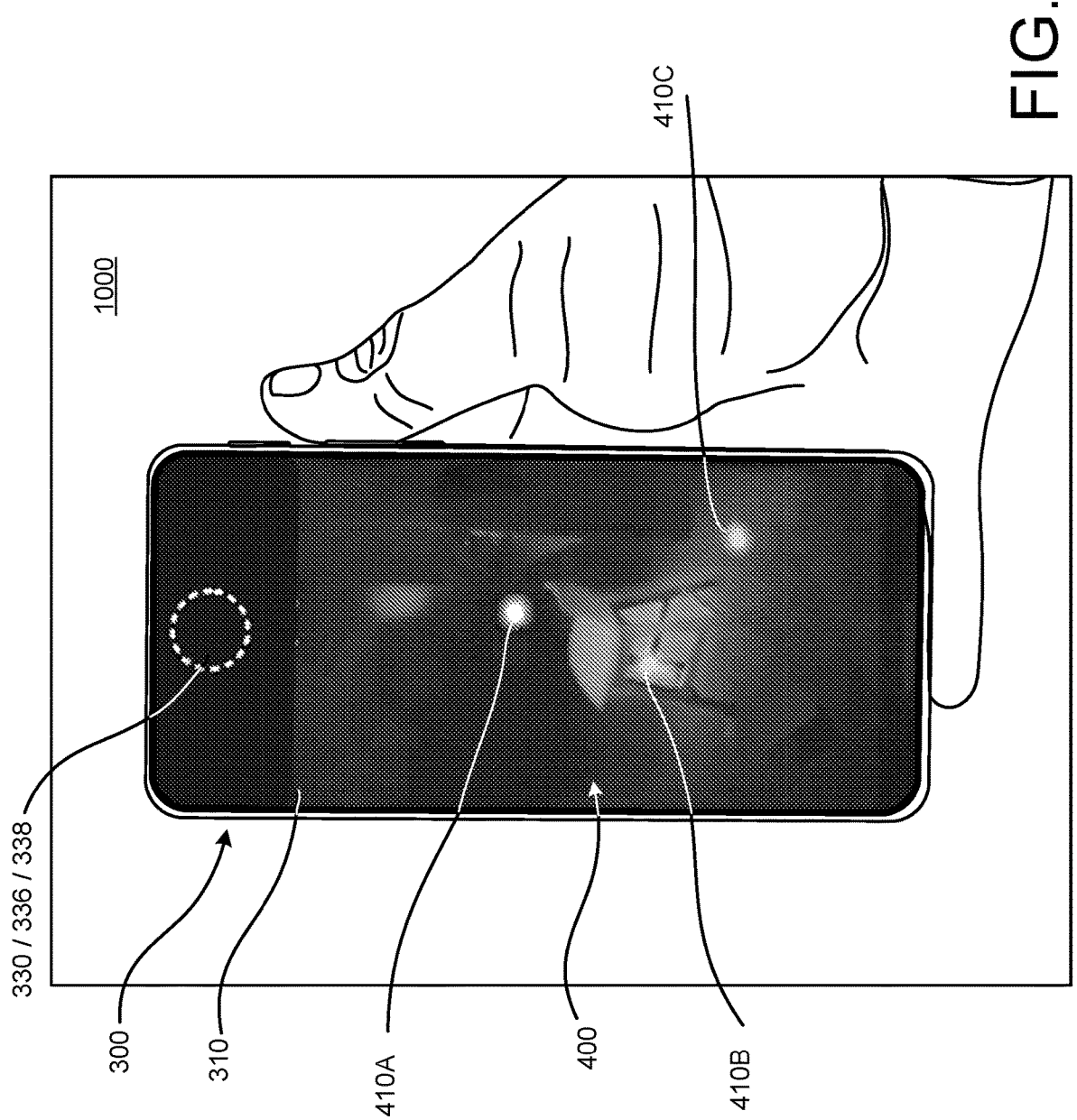

FIG. 3F illustrates an example arrangement, in which multiple virtual light sources 410A, 410B and 410C are placed at different locations in the AR scene 400, respectively corresponding to three different locations in the physical environment 1000. The incorporation of multiple virtual light sources 410 into the AR scene of the physical environment 1000 poses challenges in rendering, in that illumination provided by the propagation of light from the multiple light sources 410 may interfere, or collide, or cross. In this situation, the illumination provided by each of the multiple light sources 410 is converted individually into linear components in a linear, 2D space, and then the illumination may be mixed and converted for 3D illumination of the AR scene 400.

A system and method, in accordance with implementations described herein, may provide realistic lighting effects in response to the placement and/or to the adjustment of a virtual light source in an AR scene. That is, shading/ shadows, color, intensity, and other such factors related to the illumination of an AR scene may be adjusted as positioning, color, intensity, and other such characteristics of the light emitted by a virtual light source are adjusted. The example approach to lighting, and relighting, the AR scene 400 described above with respect to FIGS. 3A-3D, and as to be further described herein, may be applied in numerous situations in which virtual lighting is to be applied and/or adjusted, for realistic effect. For example, principles described herein may be applied in a situation in which the user wishes to simulate lighting effects that may be generated by a lamp in a dark room, while capturing images of the room in daylight conditions, for facial relighting, or other special effects when generating an AR scene.

The relatively realistic lighting, and relighting, in substantially real time, of a physical environment may rely on an understanding of the physical environment, and in particular, physical aspects of the physical environment, including, for example boundaries, physical objects within the physical boundaries and the like. For example, the lighting, and relighting, of a physical environment such as the room 1000 shown in FIG. 2, may rely on an understanding of a positioning of the boundaries defined by, for example, the walls. This may also rely on an understanding of characteristics of the physical elements, for example, the furniture, decorative items, windows, doors and the like within the room 1000. In some implementations, these characteristics may include, for example, a positioning, a shape, a contour etc. of the physical elements. In some implementations, these characteristics may include a reflectivity of the physical elements in the room 1000, a mapping of distances from the camera assembly 330 of the computing device 300 to the physical elements in the room 1000, and the like.

In some implementations, the computing device 300 may include a depth sensor 338. In some implementations, the depth sensor 338 may be separate from the camera assembly 330. In some implementations, the depth sensor 338 may be included in the camera assembly 330, and/or may work together with the camera 336. As described above, the camera assembly 330 may capture image information of the physical environment 1000, for example, portions of the physical environment 1000 within the field of view, or within a viewfinder, of the camera assembly 330, that are visible to the user on the display device 310 of the computing device 300. As the camera assembly 330 captures this image information, the depth sensor 338 may detect, or collect, depth data. Depth data detected by the depth sensor 338 may be used to develop a depth map of the physical environment 1000. The depth map may provide an understanding of a position of the physical elements in the physical environment 1000 relative to the computing device 300. For example, the depth map may provide a three-dimensional (3D) coordinate mapping of the physical environment 1000 and physical elements therein. Depth maps, and in particular, live depth maps that may be developed substantially real time as the user captures a portion of the physical environment 1000 within the field of view of the camera assembly 330/depth sensor 338 of the computing device 300, may be used to correctly composite virtual object(s) (such as virtual light sources), and occlude areas that are positioned behind physical obstacles, barriers, and the like to provide the proper lighting, shading and the like.

In some implementations, the system may utilize a depth map generated in this manner to process an input, for example, the touch input shown in FIG. 3C, to associate a location of the touch input in the AR scene 400 (for example, for positioning of the virtual light source 410) with a 3D world space coordinate in the physical environment 1000. The system may use the 3D world space coordinate associated with the placement of the virtual light source 410, together with the understanding of the physical elements in the physical environment 1000 (also gained from the depth map) to march light from the virtual light source 410 to each pixel of the image constituting the AR scene 400. This may allow for relatively realistic lighting, and relighting of the AR scene 400 of the physical environment 1000 based on the placement of the virtual light source 410.

Figure 4:
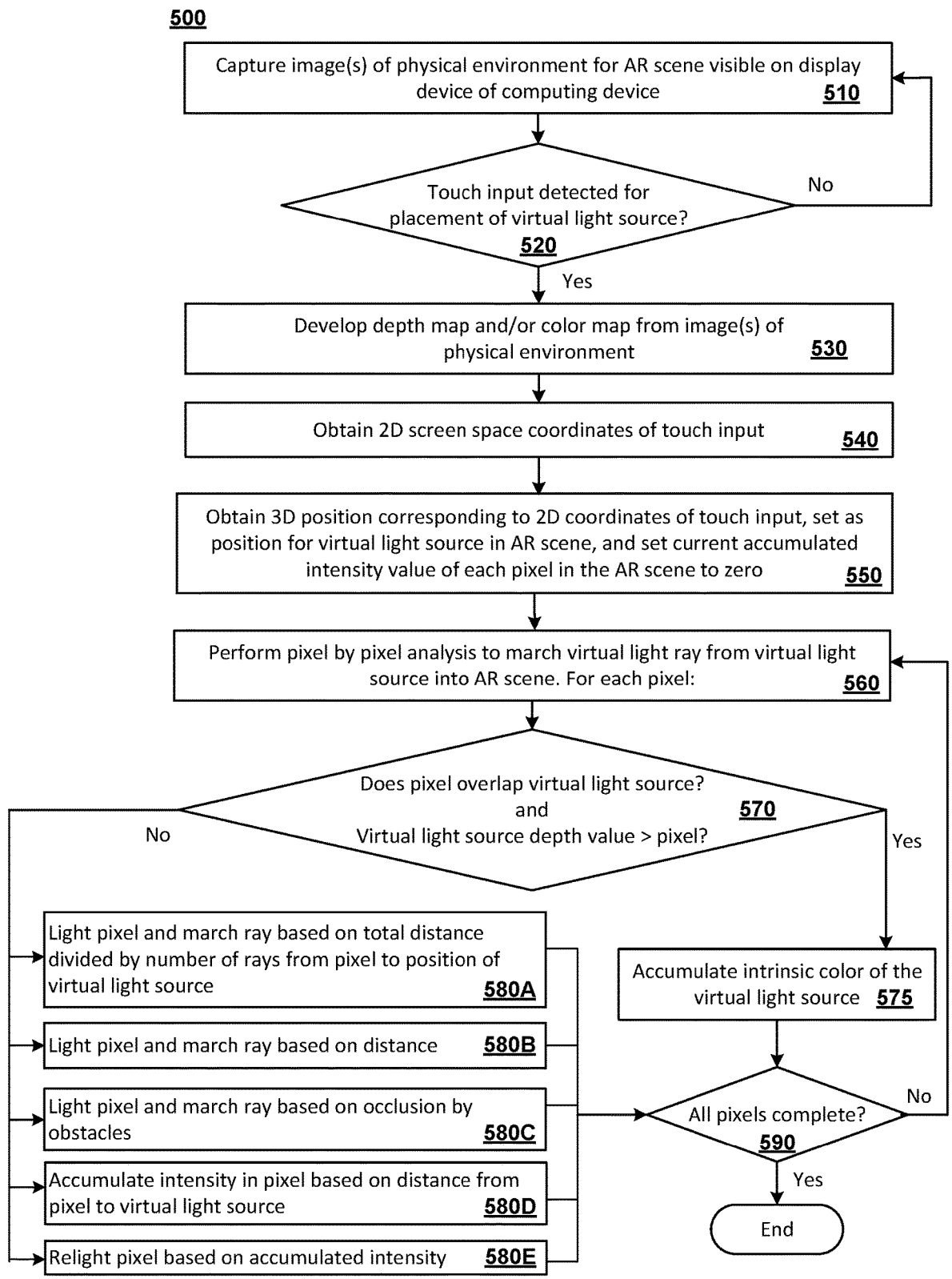
FIG. 4 is a flowchart of an example method of relighting an AR scene, according to an example implementation.
Figure 5:
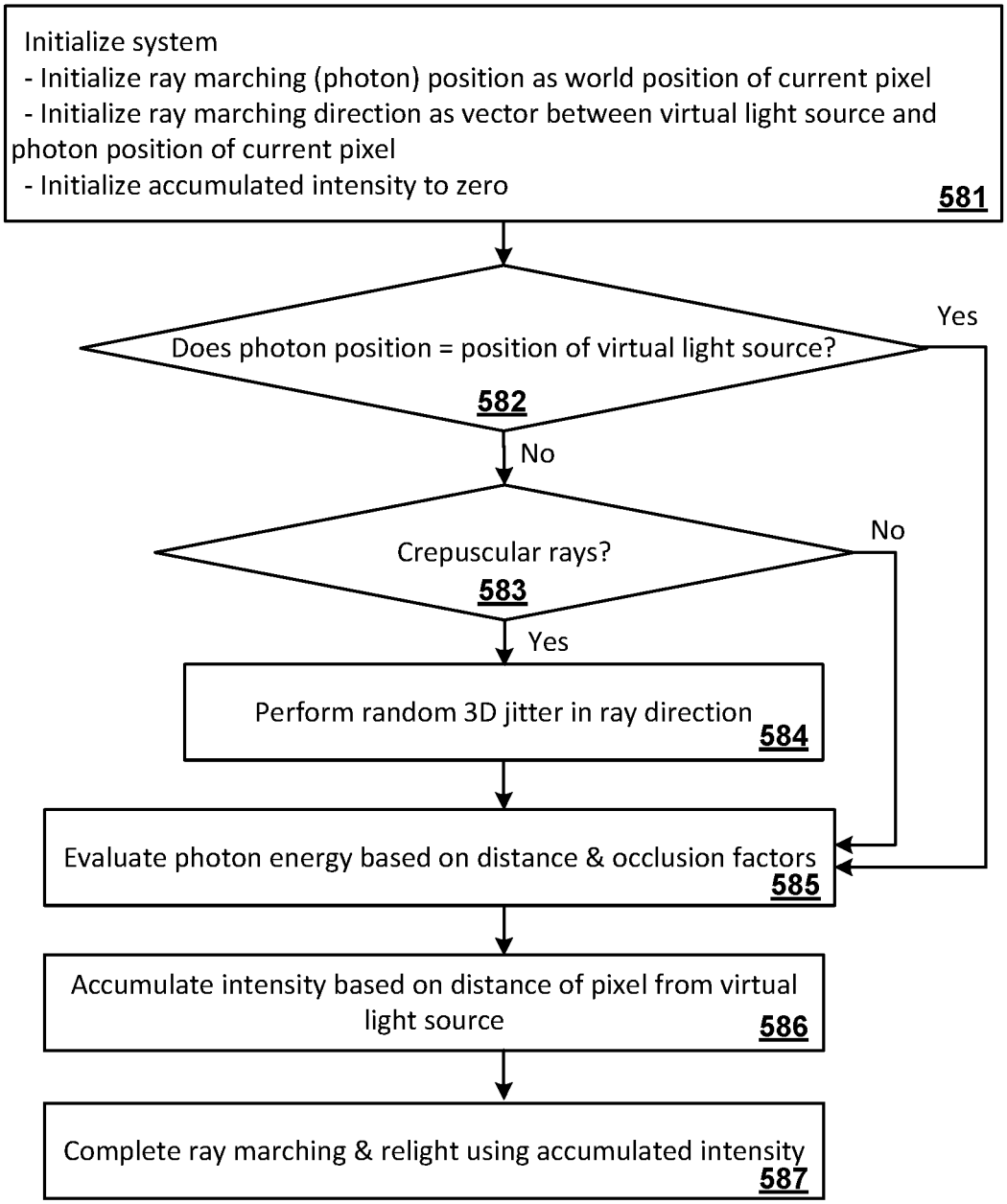
FIG. 5 is a flowchart of an example method of ray marching, according to an example implementation.

FIG. 4 is a flowchart of an example method 500 of relighting pixels of the example AR scene 400, in accordance with implementations described herein. FIG. 5 is a flowchart of an example method 580 of ray marching for achieving the relighting of pixels of the example AR scene 400, in accordance with implementations described herein.

As shown in FIG. 4, an image, or series of images, of the physical environment, such as the physical environment 1000 described above with respect to FIGS. 3A-3F, may be captured by the camera assembly 330 of the computing device 300 (block 510). The images of the physical environment 1000 may be visible on the display device 310 of the computing device 310, as shown in FIGS. 3A-3F. In response to detection of a user input for placement of a virtual light source 410 in the AR scene 400 (block 520), such as, for example, the touch input on the touchscreen display device 310 shown in FIG. 3C, the system may develop (e.g., generate, define) a depth map and/or a color map of the physical environment 1000 (block 530). As described above, in some implementations, the computing device 300 may include a depth sensor 338, either separate from or included with the camera assembly 330. As the camera assembly captures image information of the physical environment 1000, the depth sensor 338 may detect and/or collect depth data characterizing the physical elements in the physical environment 1000 to develop a depth map of the physical environment (block 530). In some implementations, the image sensor 336, or camera 336, of the camera assembly 330 may analyze color information of the images captured, and develop a color map of the physical environment 1000 (block 530). The color map may, for example, provide an understanding of the reflectivity associated with physical elements in the physical environment 1000. A pixel by pixel understanding of the physical environment 1000 displayed in the AR scene 4000 may be derived based on the depth data derived from the depth map, and color/reflectivity characteristics derived from the color map.

In response to detection of a user input for placement of a virtual light source 410 in the AR scene 400, such as, for example, the touch input on the touchscreen display device 310 shown in FIG. 3C, the system may obtain (e.g., receive) two-dimensional (2D) coordinates associated with the touch input (block 540). The 2D coordinates of the touch input in the AR scene 400 displayed on the display device 310 may be correlated to a position in the physical environment 1000 (having associated 3D coordinates) (block 550). The virtual light source 410 may be placed in the AR scene 400, corresponding to a position of the touch input on the display device 310, and to a 3D position in the physical environment 1000, as shown in FIG. 3D.

The virtual light source 410 may illuminate the AR scene 400 based on the depth data derived from the depth map and/or the color/reflectivity data derived from the color map. That is, a pixel by pixel understanding of the distance of each pixel of the AR scene 400 (corresponding to a physical element in the physical environment 1000) from the virtual light source 410 may be derived from the depth map. Similarly, a pixel by pixel understanding of the reflectivity of each pixel of the AR scene 400 (corresponding to a physical element in the physical environment 1000) may be derived from the color map. A lighting, and/or a relighting, of each pixel of the AR scene 400 may be performed based on the depth and reflectivity/color information, to allow for realistic lighting of the AR scene 400 based on the placement position of the virtual light source 410, and relighting of the AR scene 400 in substantially real time in response to changes in characteristics such as, for example, viewing perspective, light intensity, light color and other such characteristics.

In lighting and/or relighting the AR scene 400 as described above, the system may copy the depth map and the color map to the GPU, and may set an initial current accumulated intensity value for pixels in the AR scene (block 550). In some implementations, the system may set the initial current accumulated intensity value for each of the pixels in the AR scene. In some implementations, the system may set the initial current accumulated intensity value for a subset of the pixels in the AR scene. In some implementations, the system may set the initial current accumulated intensity value to zero. In some implementations, the system may set the initial current intensity value to another value. The system may then carry out a pixel-by-pixel analysis of the AR scene 400 to march a light ray into the AR scene 400 to determine a lighting intensity to be applied to each pixel (block 560). In some implementations, in conducting the pixel-by-pixel analysis, the system may determine, for each pixel of the AR scene 400, whether the pixel overlaps with the virtual light source 410 (block 570). In some implementations, in conducting the pixel-by-pixel analysis, the system may determine whether the depth value of the virtual light source 410 is greater than that of the pixel (block 570). A determination that the pixel overlaps the virtual light source 410, and that the depth value of the virtual light source 410 is greater than that of the pixel, may indicate that the pixel is co-incident, or co-located, with the virtual light source 410 and/or elements within the physical environment 1000 (included in the AR scene 400) would be obscured by the virtual light source 410 as positioned. In this instance, the pixel accumulates, or is set to, the intrinsic color and/or intensity of the virtual light source 410 (block 575).

A determination that the pixel does not overlap the virtual light source 410 and/or that the depth value of the virtual light source 410 is less than that of the pixel may trigger lighting of the pixel in accordance with the depth map and/or the color map based on an algorithm (block 580A). some implementations, a lighting of the pixel may be based on a distance of the pixel from the virtual light source 410 (block 580B). In some implementations, a lighting of the pixel may be based on a determination of whether or not a physical element in the physical environment 1000 would occlude or in some way block light between the virtual scene and the corresponding pixel in the AR scene 400 (block 580C). In some implementations, one or more rays of light may be propagated outward, from the virtual light source 410 into the AR scene 400, with intensity of the light varying as the distance from the virtual light source 410 varies (for example, the intensity of the light decreasing as the distance from the virtual light source 410 increases) (blocks 580D and 580E). The process may be repeated for each pixel until it is determined that all pixels have been analyzed (block 590).

FIG. 5 is a flowchart of an example method 580 of the ray marching algorithm described above with respect to FIG. 4 (in particular, block 580 of FIG. 4). As shown in FIG. 5, the system may be initialized for marching rays of light, pixel by pixel, in the AR scene 400 based on the placement position of the virtual light source 410 (block 581). Initializing the system may include, for example, initializing the ray marching position, or photon position, as the corresponding real world position/position in the physical environment 1000 of the current pixel. Initializing the system may also include initializing a ray marching direction as a ray, or a vector, extending between the virtual light source and the current pixel. Initializing the system may also include setting an initial accumulated intensity of the current pixel to zero.

If it is determined that the photon position for the current pixel is not the same as, or within, the position of the virtual light source (block 582), and it is determined that the light/rays to be marched are not crepuscular rays (block 583), then photon energy of the current pixel may be evaluated based on the determined distance and the any occlusion factors associated with the photon position of the current pixel relative to the position of the virtual light source (block 585). For example, in some implementations, the photon energy may be relatively significantly reduced when the propagation of light from the placement position of the virtual light source 410 into the physical environment 1000 would cause the current pixel is occluded, or blocked, by, for example, a physical element in the physical environment 1000. Additionally, in general, the greater the distance of the photon position of the current pixel from the virtual light source 410, the less, or weaker, the intensity will become. That is, in general, intensity of the ray of light propagated from the virtual light source 410 will decrease in intensity as distance from the virtual light source 410 increases. For example, in some implementations, intensity may be inversely proportional to distance from the virtual light source 410. For example, in some implementations, this relationship may follow the inverse-square law, intensity $\alpha$ $1/(distance^2)$, in which intensity (at the pixel, in this example) is inversely proportional to the square of the distance from the light source (the virtual light source 410, in this example). Intensity may be accumulated for each pixel of the AR scene 400 based on a distance of each pixel from the virtual light source 410, and corresponding rays may be marched, and the AR scene 400 may be lit, or relit, using the accumulated intensity of each of the pixels in the AR scene 400 (blocks 586 and 587).

If it is determined that the light/rays to be marched are crepuscular rays (block 583), then 3D jitter may be introduced, in the ray direction (block 584), prior to evaluation the photon energy of the current pixel based on distance from the virtual light source and any occlusion factors associated with the current pixel (block 585). In some implementations, crepuscular rays may represent distortion, or dispersion, or scattering, of light due to, for example, dust, fog and the light, rather than an essentially direct propagation of the light.

As described above, a ray-marching based algorithm may provide for the substantially real-time lighting, and relighting, of an AR scene, such as, for example, the AR scene 400 described above, or other AR scene. In some implementations, example inputs into this type of algorithm may include, for example, data from a depth map, a color map, and image(s) provided by, for example, a camera assembly 330, an image sensor 336, and a depth sensor 338 as described above. In some implementations, example inputs into this type of algorithm may also include one or more virtual light sources, such as, for example, the virtual light source 410 described above, associated locations for each virtual light source, associated intensity for each virtual light source, associated color for each virtual light source, and other such characteristics. In some implementations, example output of this type of algorithm may be the relit image of the AR scene including the physical environment and the one or more virtual light sources. An example algorithm is shown in FIG. 6.

As described above, a system and method, in accordance with implementations described herein, may allow a user to anchor a virtual light source in the 3D physical environment, or real world, in real time, to provide for realistic lighting and relighting of the 3D, physical, real world, and elements therein. A system and method, in accordance with implementations described herein, may provide for the substantially real time lighting and relighting based on a live depth map developed in substantially real time for the particular AR scene to be generated. In some implementations, one or more characteristics of the virtual lighting to be incorporated into the AR scene 400 may be altered or changed. For example, in some implementations, more than one virtual light source may be placed in the AR scene 400. In some implementations, a perspective of the physical environment, as viewed on the computing device, may change based on, for example, movement of the computing device, driving a change in the illumination of the physical environment by the virtual light source(s) and a corresponding relighting of the physical environment shown in the AR scene.

The examples described above are described with respect to point light sources, for purposes of discussion and illustration. The principles described herein may be applied to other types of virtual light sources that may be incorporated into an AR scene of a physical environment, such as, for example, surface lighting sources, hemisphere lighting sources and the like. Similarly, the principles described herein may be applied to simulate different types of lighting in a space represented in an AR scene. For example, a system and method, in accordance with implementations described herein, may simulate different natural lighting conditions such as, for example, daytime or nighttime lighting conditions, early morning, midday, evening lighting conditions, and the like, by varying the intensity and the color temperature of the virtual light sources in the AR scene. Further, the examples described above are described with respect to application of virtual lighting of a physical environment including physical elements, simply for purposes of discussion and illustration. The principles described herein may be applied to lighting in other types of AR scenes, portrait/facial lighting and the like.

FIGS. 7A-7D illustrate the lighting, or relighting, of an AR scene 400 including the physical environment 1000 (shown in FIGS. 3A-3F), as viewed on the display device 310 of the computing device 300, in accordance with implementations described herein. In one example, the user may wish to compare different lighting alternatives (for example, from an online/network accessible external source, such as one or more stores), to gain an understanding of not just how a lighting device will look in the physical environment 1000, but how the lighting device will illuminate the physical environment 1000, particularly in darkened conditions.

Figure 7A:
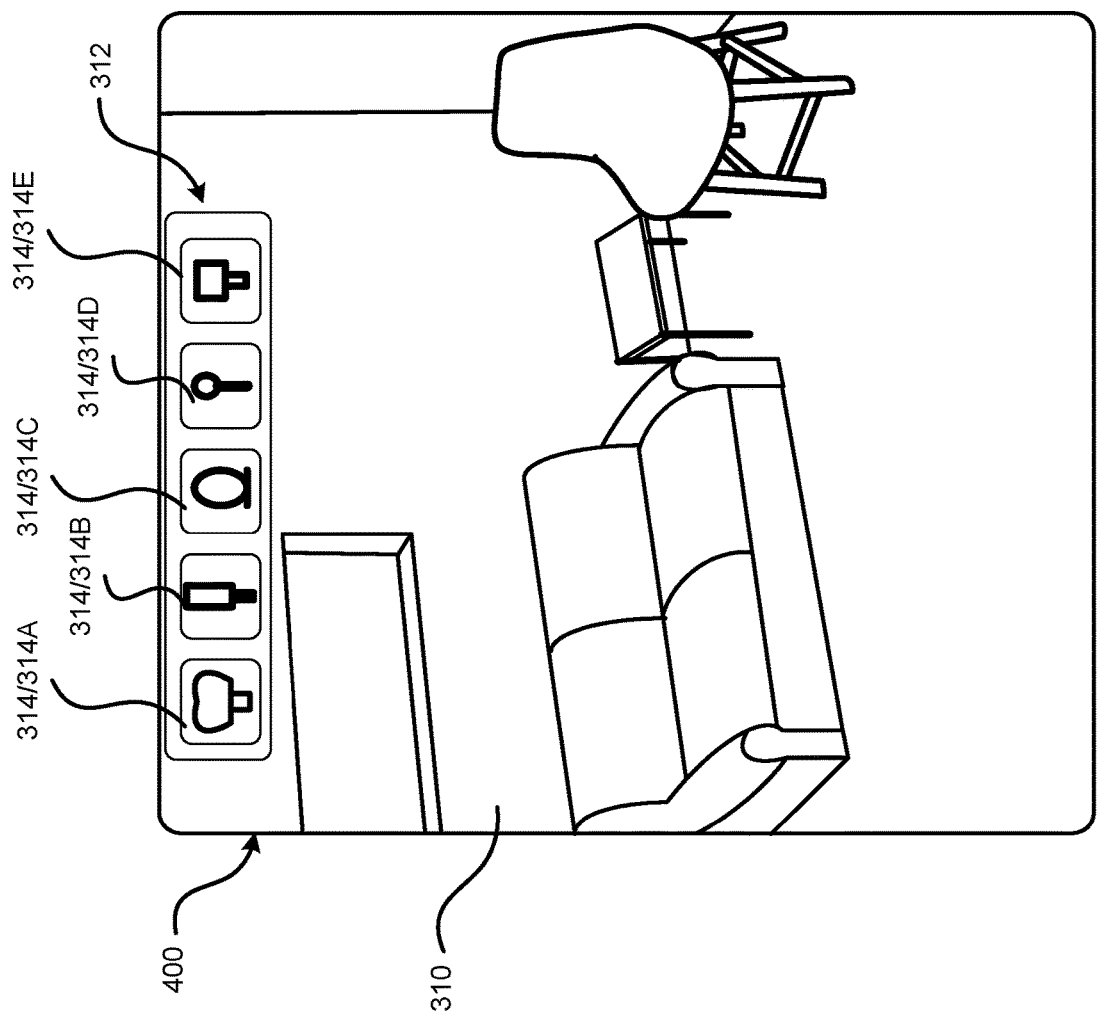
FIGS. 7A-7D illustrate lighting and relighting of an example AR scene in response to user input, according to an example implementation.

As shown in FIG. 7A, a portion of the physical environment 1000, captured within the live viewfinder of the camera assembly 330, may be visible on the display device 310 of the computing device 300. In this view, a menu bar 312, including icons 314 representing different lighting alternatives 314A, 314B, 314C, 314D and 314E, are also displayed on the display device 310. In some situations, the user may have selected these alternatives through, for example, browsing one or more websites. In some situations, the system may provide suggestions based on the understanding of physical environment 1000 gained from, for example, the depth mapping and/or color mapping of the physical environment 1000.

Figure 7B:
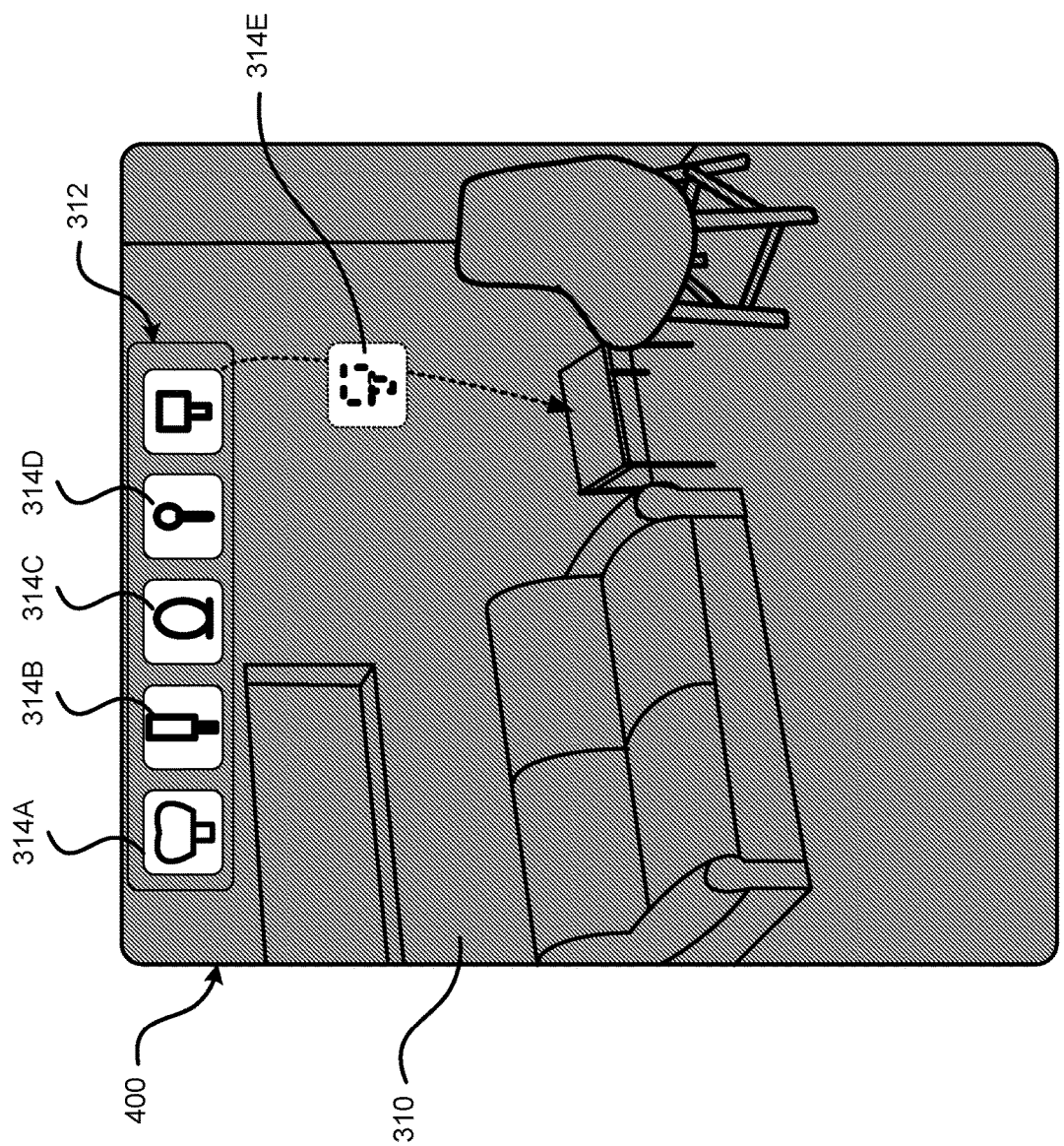
Figure 7C:
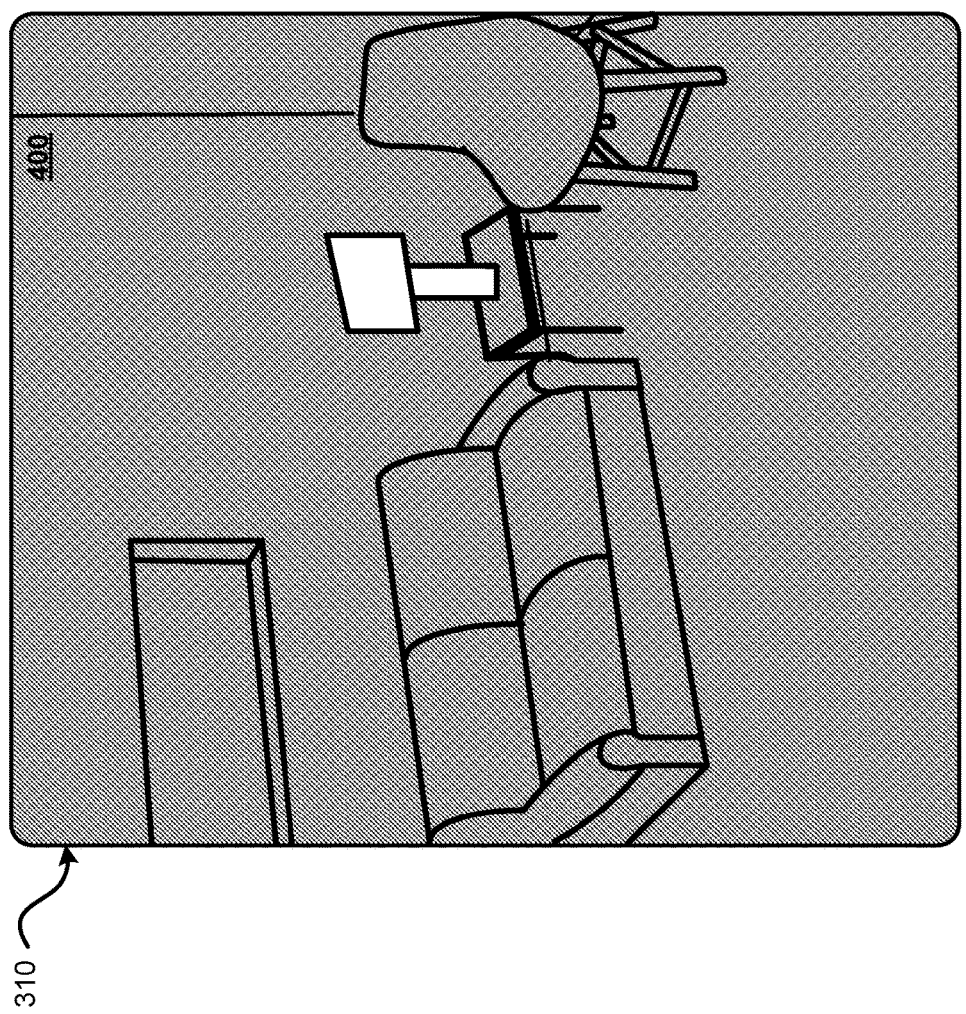
Figure 7D:
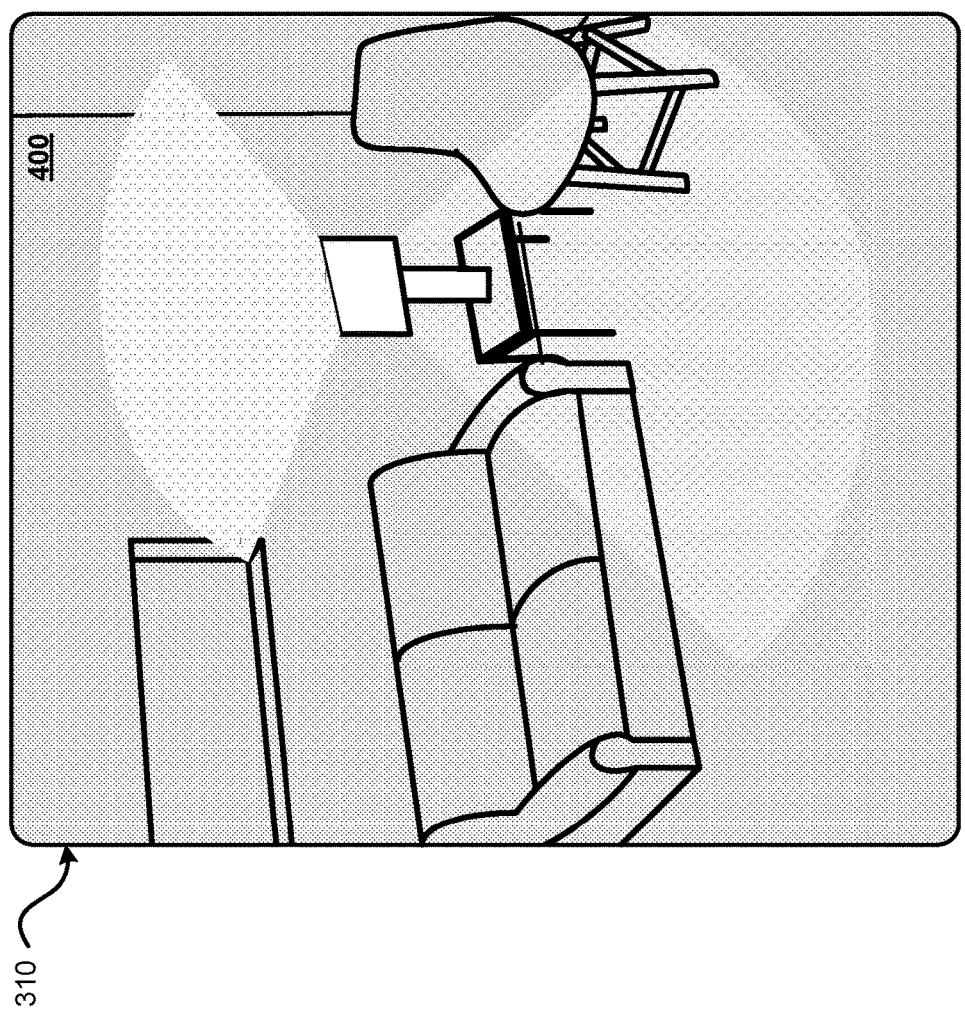

In FIG. 7A, the physical environment 1000 is in daylight conditions, illuminated by natural light. In selecting a lighting device for the physical environment 1000, the user may wish to determine how the different lighting alternatives, represented by the icons 314 in the menu bar 312, may illuminate the physical environment 1000 in darkened conditions. In FIGS. 7B and 7C, the user has selected the lighting device represented by the icon 314E, for placement in the AR scene 400 (for example, with a touch input, as described above with respect to FIGS. 3A-3F). In FIGS. 7B and 7C, the AR scene 400 displays the physical environment in a darkened state, even though the image of the physical environment 1000 is being captured in daylight conditions, so that illumination of the physical environment 1000 by the selected lighting device in darkened conditions can be assessed by the user. FIG. 7D illustrates illumination of the (darkened) physical environment 1000 by the selected lighting device in the AR scene 400. The relighting of the AR scene 400 may be carried out as described above, in accordance with the processes and algorithm described in FIGS. 4, 5 and 6.

FIGS. 8A-8F illustrate examples of facial relighting, in accordance with implementations described herein. The facial relighting effects to be described with respect to FIGS. 8A-8F are merely exemplary in nature. Other lighting effects may be achieved with different types and/or placement of virtual lighting within a virtual scene including facial images.

Figure 8B:
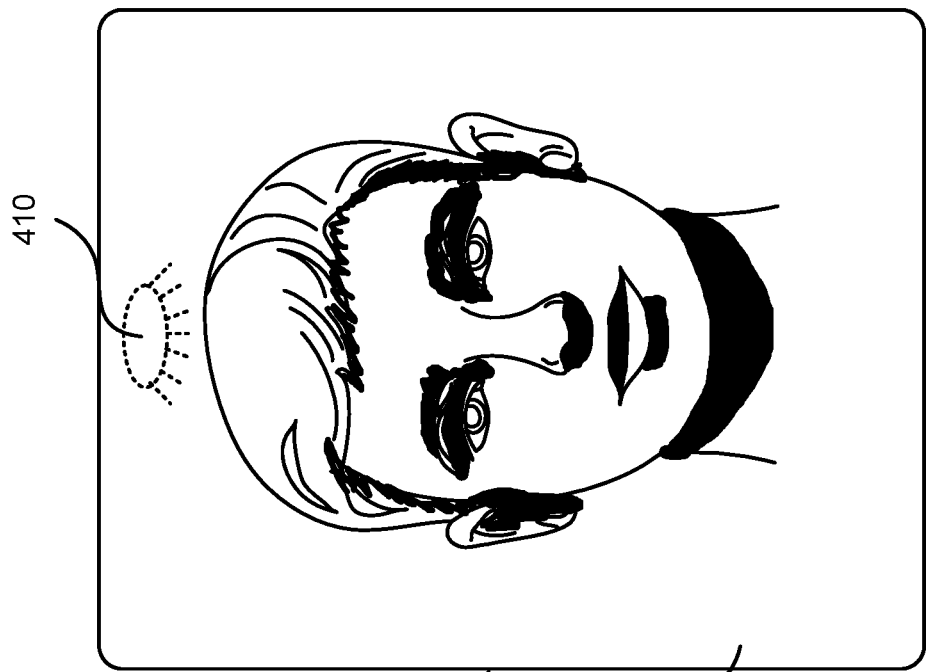
FIGS. 8A-8F illustrate examples of facial relighting, according to an example implementation.
Figure 8A:

In FIG. 8A, an image of a face of a user is displayed on the display device 310 of the computing device 300. In some situations, the user may choose to add lighting to the image in the virtual scene 400, in one or more locations relative to the image, to, for example, enhance facial features and the like. For example, in FIG. 8B, the user may place a virtual light source 410 at a first location relative to the facial image in the virtual scene 400, to produce a downlighting effect. The virtual light source 410 may be positioned in the virtual scene 400 in, for example, the manner described above with respect to FIGS. 3A-3F. In some implementations, the virtual light source 410 may also be visible on the display device 310, as for example, a glowing element. In some implementations, the virtual light source 410 is not visible in the virtual scene 400 displayed on the display device 310, but the effects of the virtual light source 410 are visible in the facial image displayed in the virtual scene 400. The illumination produced by the virtual light source 410, and the effect of that illumination on the elements included in the virtual scene 400 (in this example, the facial image) may be generated as described above with respect to FIGS. 4, 5, and 6.

Figure 8D:
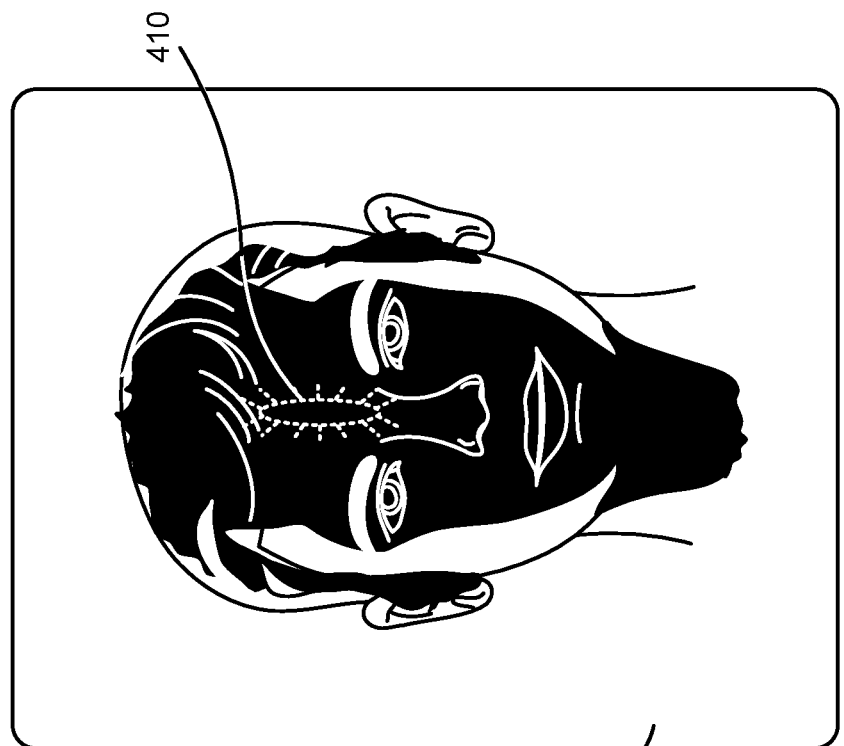
Figure 8C:
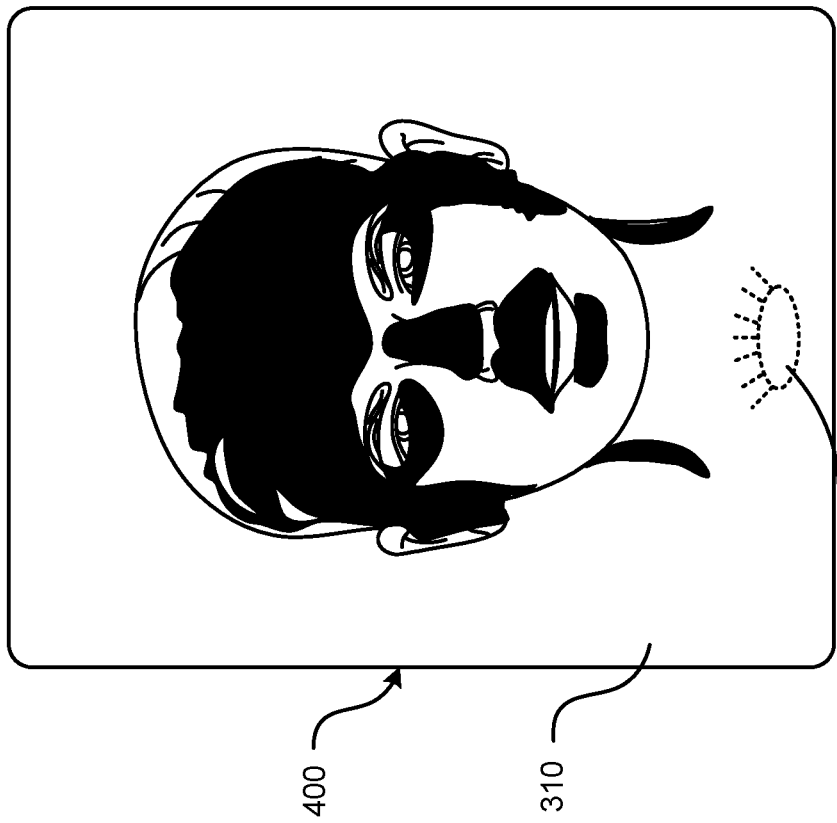
Figure 8F:
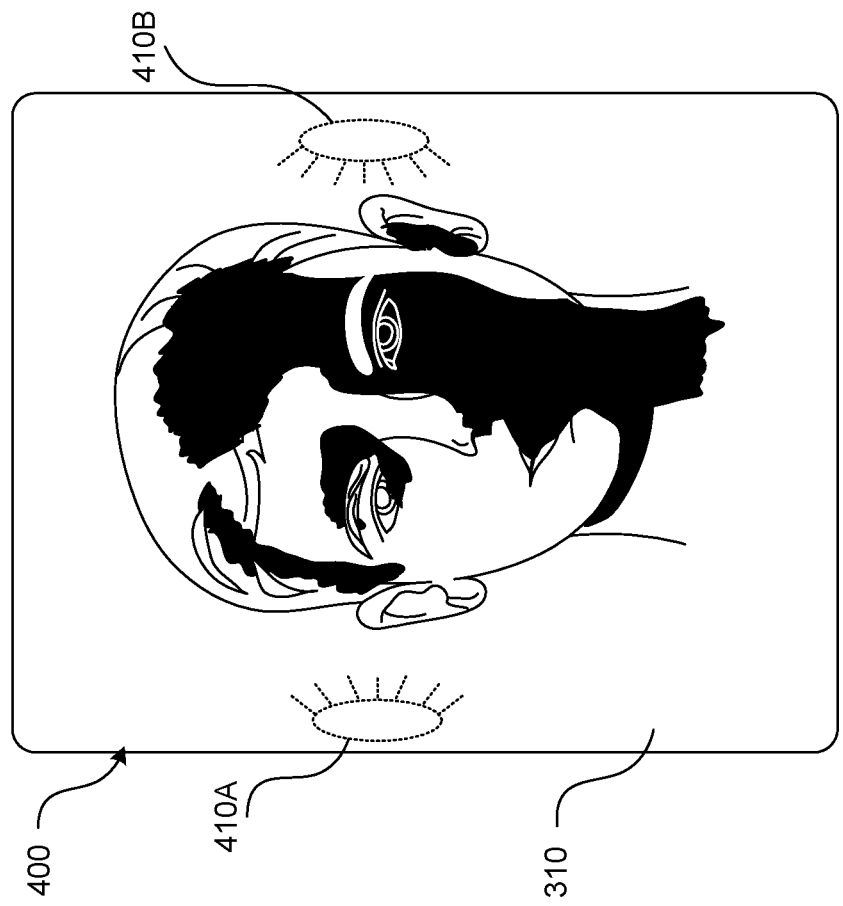
Figure 8E:
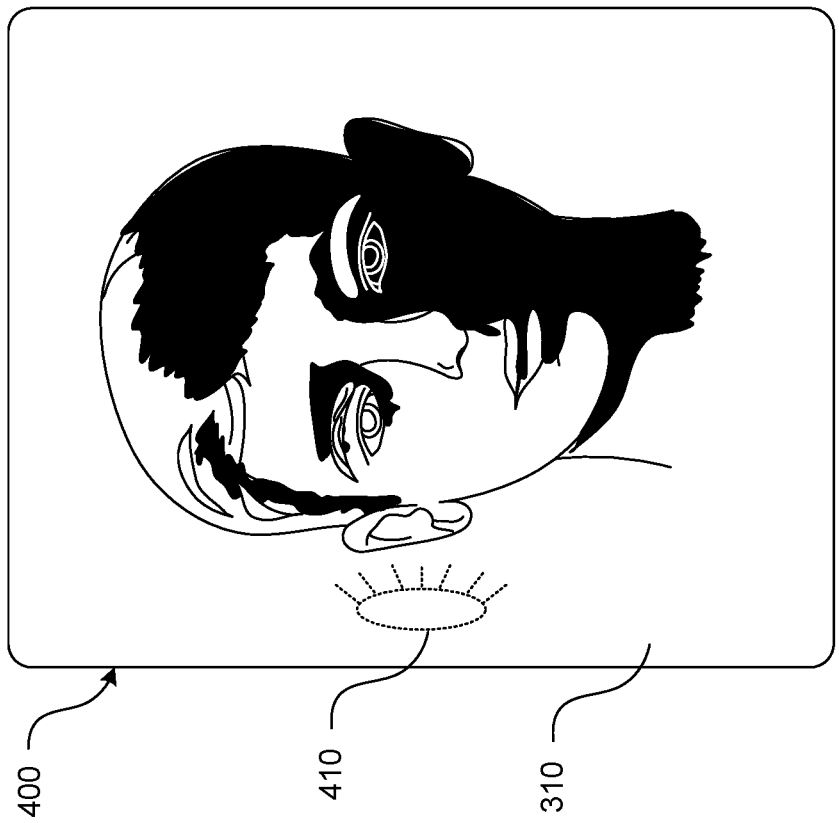

In the example shown in FIG. 8C, the user has placed the virtual light source 410 at a location relative to the facial image in the virtual scene 400 to produce an uplighting effect. The virtual light source 410 may be positioned in the virtual scene 400 in, for example, the manner described above with respect to FIGS. 3A-3F. In some implementations, the virtual light source 410 may also be visible on the display device 310, as for example, a glowing element. In some implementations, the virtual light source 410 is not visible in the virtual scene 400 displayed on the display device 310, but the effects of the virtual light source 410 are visible in the facial image displayed in the virtual scene 400. The illumination produced by the virtual light source 410, and the effect of that illumination on the elements included in the virtual scene 400 (in this example, the facial image) may be generated as described above with respect to FIGS. 4, 5, and 6.

Similarly, in the example shown in FIG. 8D, the user has placed the virtual light source 410 at a location relative to the facial image in the virtual scene 400 to produce a backlighting effect. In the example shown in FIG. 8E, the user has placed the virtual light source 410 at a location relative to the facial image in the virtual scene 400 to produce a sidelighting effect. In the example shown in FIG. 8F, the user has placed a first virtual light source 410A at a first location, and a second virtual light source 410B at a second location, to produce a double sidelighting effect. The virtual light source 410 may be positioned in the virtual scene 400 in, for example, the manner described above with respect to FIGS. 3A-3F. In some implementations, the virtual light source 410 may also be visible on the display device 310, as for example, a glowing element. In some implementations, the virtual light source 410 is not visible in the virtual scene 400 displayed on the display device 310, but the effects of the virtual light source 410 are visible in the facial image displayed in the virtual scene 400. The illumination produced by the virtual light source 410, and the effect of that illumination on the elements included in the virtual scene 400 (in this example, the facial image) may be generated as described above with respect to FIGS. 4, 5 and 6.

The system and method has been described herein with respect to a handheld computing device, such as a smartphone, simply for ease of discussion and illustration. The principles described herein may be applied to numerous different types of mobile computing devices that include a camera assembly and display capability, in addition to the example handheld computing device used herein for illustrative purposes. For example, the principles described herein may be applied to wearable computing devices such as head mounted display devices, smart glasses, wrist worn computing devices, and the like, as well as tablet computing devices, laptop computing devices, and other such computing devices.

Figure 9:
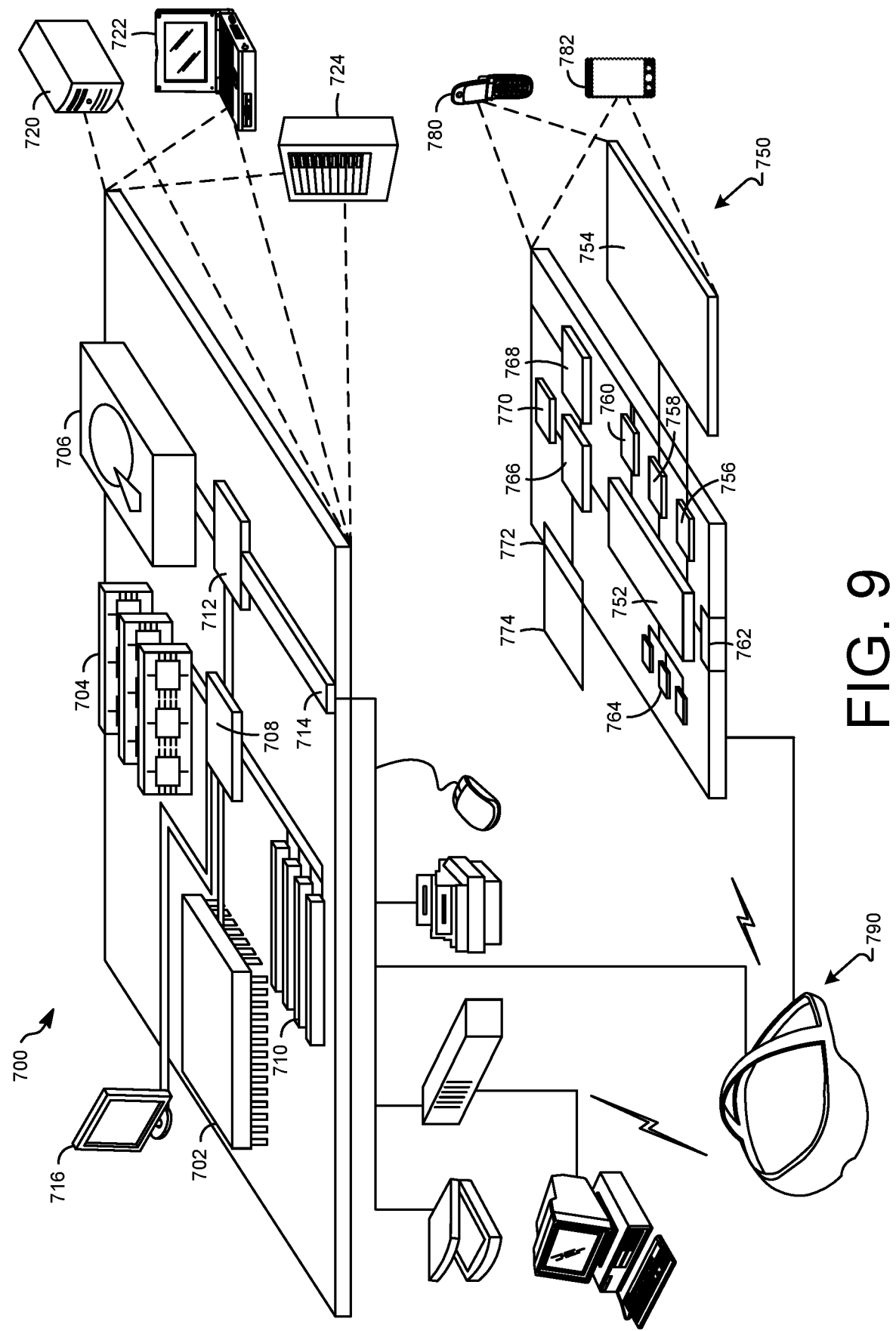
FIG. 9 illustrates an example of a computing device and a mobile computing device, which may be used with the techniques described here.

FIG. 9 shows an example of a computing device 700 and a mobile computing device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In some implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid-state memory device, or an array of devices, including devices in a storage area network or other configurations. The computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low speed controller 712 manages lower bandwidth-intensive operations. Such allocation of functions is exemplary only. In some implementations, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 752, 754, 764, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, to enable near area communication of device 750 with other devices. External interface 762 may provide, for example, for wired communication in some implementations, or for wireless communication in some implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In some implementations, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation In some or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations s only and is not intended to be limiting of example implementations. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device or mobile electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations are not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

What is claimed is:

1. A computer-implemented method, comprising:
   capturing, by an image sensor of a computing device, image data corresponding to an image of a physical environment;
   detecting, by a depth sensor, depth data corresponding to the physical environment;
   generating, by a processor, an augmented reality (AR) scene from the image data corresponding to the image of the physical environment;
   receiving, at an input device of the computing device, an input for a position of a virtual light source in the AR scene;

determining a two-dimensional position of the input received at the input device;

determining a three-dimensional position, corresponding to a placement position of the virtual light source in the AR scene, the three-dimensional position corresponding to the two-dimensional position of the input received at the input device;

placing a virtual light source in the AR scene at the three-dimensional position; and relighting an object in the AR scene, and at least a portion of the physical environment adjacent the object, based on the three-dimensional position of the virtual light source in the AR scene and the depth data corresponding to the physical environment.

2. The computer-implemented method of claim 1, wherein detecting the depth data includes generating a depth map corresponding to the physical environment.

3. The computer-implemented method of claim 2, wherein relighting the AR scene includes:

for each pixel, of a plurality of pixels of the AR scene:
setting an intensity level of the pixel based on an intensity of the virtual light source and a distance of the pixel from the virtual light source in the AR scene;
setting a color of the pixel based on a color of the virtual light source, the distance of the pixel from the virtual light source, and a color of the pixel in the AR scene; and
setting a reflectivity of the pixel based on the color of the virtual light source and the color of the pixel in the AR scene.

4. The computer-implemented method of claim 3, wherein relighting the AR scene includes, for each pixel of the plurality of pixels of the AR scene:

detecting obstacles between the placement position of the virtual light source and the pixel based on the depth map; and adjusting the intensity level, the color, and the reflectivity of the pixel based on the obstacles detected between the placement position of the virtual light source and the pixel.

5. The computer-implemented method of claim 4, wherein relighting the AR scene includes:

applying the adjusted intensity level, the adjusted color, and the adjusted reflectivity, to the AR scene;

generating a composite rendering of the physical environment in the AR scene including the adjusted intensity level, the adjusted color, and the adjusted reflectivity; and displaying the composite rendering of the AR scene on a display device of the computing device.

6. The computer-implemented method of claim 3, wherein relighting the AR scene includes, for each pixel of the plurality of pixels:

detecting a distance of the pixel from the placement position of the virtual light source in the AR scene; and in response to detection of the pixel at a position corresponding to the placement position of the virtual light source in the AR scene, setting the intensity, the color and the reflectivity of the pixel to the intensity, the color and the reflectivity of the virtual light source.

7. The computer-implemented method of claim 6, wherein the intensity of the pixel is inversely proportional to a square of the distance between the virtual light source and the pixel.

8. The computer-implemented method of claim 1, further comprising:

detecting, by the image sensor, color data corresponding to the image of the physical environment; and generating a color map corresponding to the image of the physical environment, the color map providing at least one of color characteristics or reflectivity characteristics of each pixel of a plurality of pixels of the AR scene of the physical environment.

9. The computer-implemented method of claim 1, wherein generating the AR scene includes displaying the image of the physical environment in a darkened state, including darkening the image of the object and at least a portion of the physical environment adjacent the object to simulate a darkened physical environment without ambient lighting.

10. The computer-implemented method of claim 9, wherein relighting the AR scene includes relighting the AR scene generated from the darkened image of the physical environment, including, for each pixel of a plurality of pixels located between the virtual light source and the object, relighting the pixel to at least one of an adjusted intensity level, an adjusted color, and an adjusted reflectivity.

11. The computer-implemented method of claim 9, wherein relighting the AR scene includes relighting the AR scene generated from the darkened image of the physical environment to simulate illumination of the physical environment by the virtual light source without the influence of the ambient lighting.

12. The computer-implemented method of claim 1, further comprising receiving, at the input device of the computing device, an input placing a second virtual light source in the AR scene;

wherein the relighting the AR scene includes relighting the AR scene based on the placement position of the virtual light source in the AR scene and the placement position of the second virtual light source in the AR scene.

13. The computer-implemented method of claim 1, wherein relighting the AR scene includes relighting a portion of the AR scene located between the virtual light source and the object.

14. A system, comprising:
a camera assembly;
a display device;
at least one processor; and
a memory storing instructions that, when executed by the at least one processor, cause the system to:
capture image data corresponding to an image of a physical environment;
detect depth data corresponding to the physical environment;
generate an augmented reality (AR) scene from the image data corresponding to the image of the physical environment;
receive an input at a position on an input portion of the display device displaying the AR scene corresponding to a selected placement position of a virtual light source in the AR scene; and
relight an object in the AR scene, and at least a portion of the physical environment adjacent the object, based on the placement position of the virtual light source in the AR scene and the depth data corresponding to the physical environment.

15. The system of claim 14, wherein the camera assembly includes a depth sensor and an image sensor, and wherein the instructions cause the system to at least one of:
  generate a depth map of the physical environment based on the depth data collected by the depth sensor; or
  generate a color map of the physical environment based on the image data collected by the image sensor, the color map providing at least one of color characteristics or reflectivity characteristics of each pixel of a plurality of pixels of the AR scene of the physical environment.

16. The system of claim 15, wherein the instructions cause the system to:
  detect a three-dimensional position of the virtual light source in the physical environment corresponding to the placement position of the virtual light source in the AR scene; and
  for each pixel, of a plurality of pixels of the AR scene:
    set an intensity level of the pixel based on an intensity of the virtual light source and a distance of the pixel from the virtual light source in the AR scene;
    set a color of the pixel based on a color of the virtual light source, the distance of the pixel from the virtual light source, and a color of the pixel in the AR scene; and
    set a reflectivity of the pixel based on the color of the virtual light source and the color of the pixel in the AR scene.

17. The system of claim 16, wherein the instructions cause the system to:
  detect obstacles between the placement position of the virtual light source in the AR scene and the pixel based on the depth map; and
  adjust the intensity level, the color, and the reflectivity of the pixel based on the obstacles detected between the placement position of the virtual light source in the AR scene and the pixel.

18. The system of claim 17, wherein the instructions cause the system to:
  generate a darkened image of the physical environment in the AR scene to simulate a darkened physical environment; and
  relight the AR scene generated from the darkened image of the physical environment, including, for each pixel of the plurality of pixels:
    relight the pixel to the adjusted intensity level, the adjusted color, and the adjusted reflectivity.

19. The system of claim 17, wherein the instructions cause the system to:
  apply the adjusted intensity level, the adjusted color, and the adjusted reflectivity, to the AR scene;
  generate a composite rendering of the physical environment in the AR scene including the adjusted intensity level, the adjusted color, and the adjusted reflectivity; and
  display the composite rendering of the AR scene on the display device.

20. The system of claim 16, wherein the instructions cause the system to, for each pixel of the plurality of pixels:
  detect a distance of the pixel from the placement position of the virtual light source in the AR scene; and
  in response to detection of the pixel at a position corresponding to the placement position of the virtual light source in the AR scene, set the intensity, the color and the reflectivity of the pixel to the intensity, the color and the reflectivity of the virtual light source.

21. The system of claim 20, wherein the intensity of the pixel is inversely proportional to a square of the distance between the virtual light source and the pixel.

* * * * *